(12) United States Patent
Saito et al.

(10) Patent No.: US 11,290,901 B2
(45) Date of Patent: Mar. 29, 2022

(54) USER EQUIPMENT AND MEASUREMENT METHOD

(71) Applicant: NTT DOCOMO, INC., Tokyo (JP)

(72) Inventors: Keisuke Saito, Tokyo (JP); Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/300,018

(22) PCT Filed: Mar. 30, 2017

(86) PCT No.: PCT/JP2017/013215
§ 371 (c)(1),
(2) Date: Nov. 8, 2018

(87) PCT Pub. No.: WO2017/195490
PCT Pub. Date: Nov. 16, 2017

(65) Prior Publication Data
US 2019/0150019 A1   May 16, 2019

(30) Foreign Application Priority Data
May 12, 2016 (JP) .............................. JP2016-096571

(51) Int. Cl.
*H04W 24/10* (2009.01)
*H04B 17/309* (2015.01)
(Continued)

(52) U.S. Cl.
CPC .......... *H04W 24/10* (2013.01); *H04B 17/309* (2015.01); *H04W 16/28* (2013.01); *H04W 72/04* (2013.01)

(58) Field of Classification Search
CPC ..... H04W 24/02; H04W 24/04; H04W 24/08; H04W 24/10; H04W 72/02; H04W 72/04;
(Continued)

(56) References Cited

U.S. PATENT DOCUMENTS 9,036,572 B2 * 5/2015 Kim ...................... H04W 24/10
370/329
10,305,654 B2 * 5/2019 Seo .................... H04W 72/0453
(Continued)

FOREIGN PATENT DOCUMENTS

CN   104956606 A   9/2015
JP   2015-514349 A   5/2015
(Continued)

OTHER PUBLICATIONS

Docomo 5G White Paper;"5G Radio Access: Requirements, Concept and Technologies"; Jul. 2014 (27 Pages).
(Continued)

*Primary Examiner* — Candal Elpenord
(74) *Attorney, Agent, or Firm* — Osha Bergman Watanabe & Burton LLP

(57) ABSTRACT

Provided is a user equipment in a radio communication system including a base station and the user equipment, including a first measuring unit that measures a reception quality or channel information using a first reference signal transmitted in a time interval which is set periodically in a radio frame divided into predetermined time intervals, a second measuring unit that measures a reception quality or channel information using a second reference signal transmitted in a flexibly-selected time interval other than the time interval which is set periodically in the radio frame divided into the predetermined time intervals, and a reporting unit that reports the reception quality or the channel information measured using the first reference signal and the reception
(Continued)

quality or the channel information measured using the second reference signal to the base station.

4 Claims, 28 Drawing Sheets

(51) Int. Cl.
  *H04W 72/04* (2009.01)
  *H04W 16/28* (2009.01)
(58) Field of Classification Search
  CPC ... H04W 16/28; H04B 17/309; H04B 17/336; H04B 17/373
  USPC .......................................... 370/252, 328–330
  See application file for complete search history.

(56) References Cited

U.S. PATENT DOCUMENTS

| | | | | |
|---|---|---|---|---|
| 10,841,824 B2* | 11/2020 | Kim | ....................... | H04W 24/10 |
| 2011/0268028 A1* | 11/2011 | Stern-Berkowitz | ........................... | H04L 5/0048 |
| | | | | 370/328 |
| 2012/0182895 A1* | 7/2012 | Jwa | ..................... | H04W 72/046 |
| | | | | 370/252 |
| 2013/0094384 A1* | 4/2013 | Park | ...................... | H04L 5/0053 |
| | | | | 370/252 |
| 2013/0258874 A1* | 10/2013 | Khoshnevis | .......... | H04L 5/0057 |
| | | | | 370/252 |
| 2014/0286182 A1* | 9/2014 | Chen | ..................... | H04L 1/0026 |
| | | | | 370/252 |
| 2014/0341051 A1 | 11/2014 | Gaal et al. | | |
| 2015/0036612 A1* | 2/2015 | Kim | ....................... | H04B 17/00 |
| | | | | 370/329 |
| 2015/0087296 A1 | 3/2015 | Kim et al. | | |
| 2015/0173102 A1 | 6/2015 | Ruiz Delgado et al. | | |
| 2015/0327098 A1* | 11/2015 | Chai | ..................... | H04W 24/08 |
| | | | | 370/252 |
| 2015/0382205 A1* | 12/2015 | Lee | ....................... | H04L 5/0048 |
| | | | | 370/329 |
| 2016/0174093 A1* | 6/2016 | Zhou | ..................... | H04L 5/0094 |
| | | | | 370/252 |
| 2016/0212643 A1* | 7/2016 | Park | ...................... | H04L 5/0048 |
| 2017/0078062 A1* | 3/2017 | Park | ......................... | H04J 11/00 |
| 2017/0347284 A1* | 11/2017 | Wang | .................... | H04W 24/10 |
| 2018/0063736 A1* | 3/2018 | Sadeghi | ................ | H04W 24/10 |
| 2018/0309532 A1* | 10/2018 | Shimezawa | ........... | H04W 72/04 |
| 2021/0306870 A1 | 9/2021 | Lee et al. | | |

FOREIGN PATENT DOCUMENTS

| | | |
|---|---|---|
| WO | 2014/186456 A1 | 11/2014 |
| WO | 2015/088046 A1 | 6/2015 |
| WO | 2015/156573 A1 | 10/2015 |
| WO | 2016/052019 A1 | 4/2016 |

OTHER PUBLICATIONS

Anass Benjebbour et. al.; "5G Radio Access Technology";Special Articles on 5G Technologies toward 2020 Deployment, NTT Docomo Technical Journal vol. 17 No. 4; Jan. 2016 (25 Pages).
International Search Report issued in PCT/JP2017/013215 dated May 16, 2017 (5 Pages).
Written Opinion of the International Searching Authority issued in PCT/JP2017/013215 dated May 16, 2017 (9 Pages).
Office Action in counterpart European Patent Application No. 17 795 851.9 dated Sep. 15, 2021 (6 pages).
Office Action issued in the counterpart Chinese Patent Application No. 201780028585.X, dated Jun. 2, 2021 (18 pages).
Office Action issued in counterpart Chinese Application No. 201780028585.X dated Oct. 19, 2021 (20 pages).

* cited by examiner

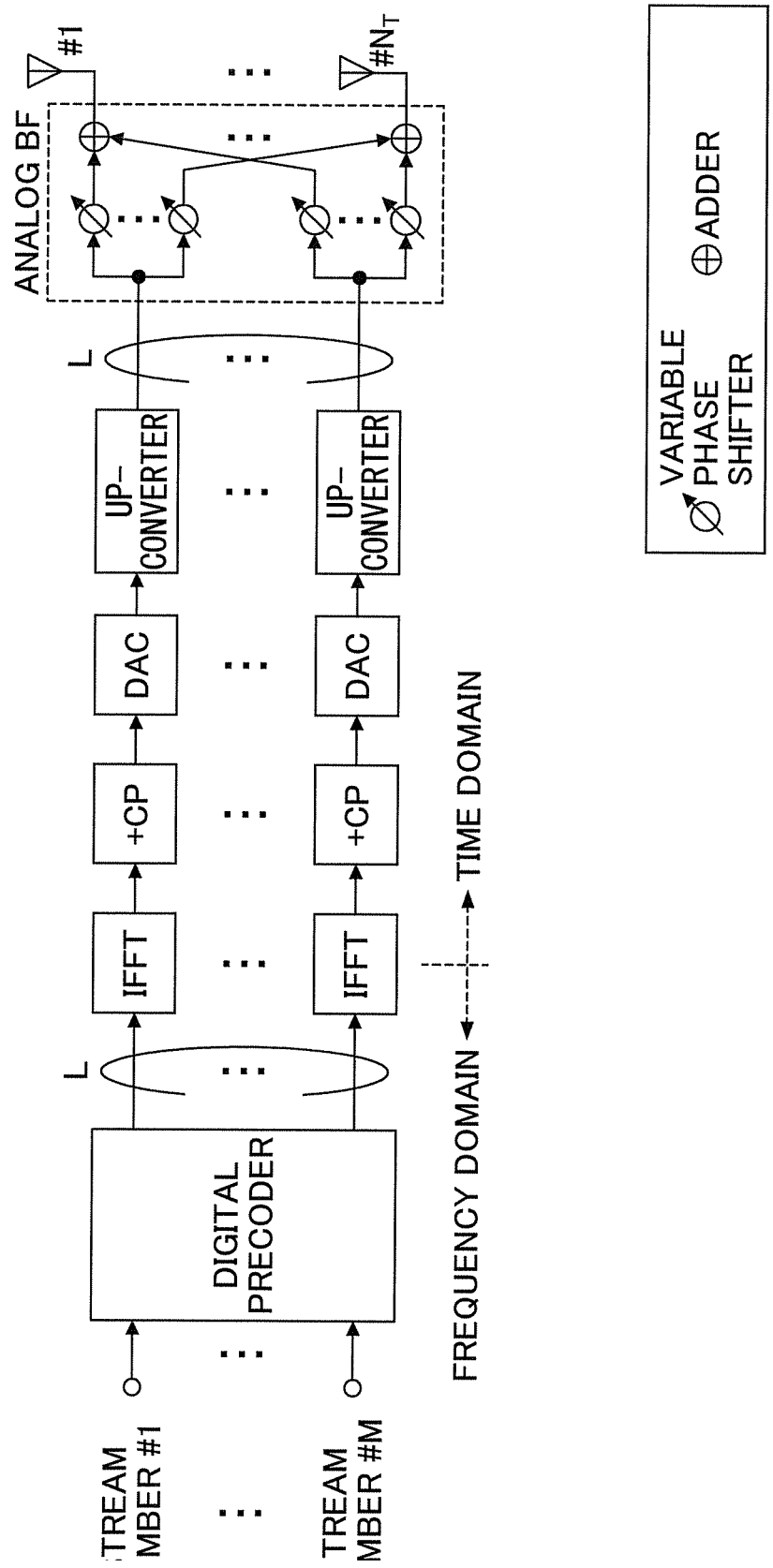

FIG.12
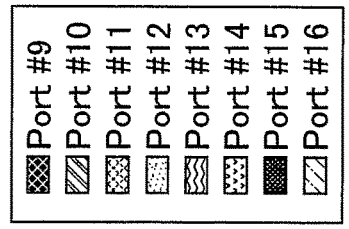
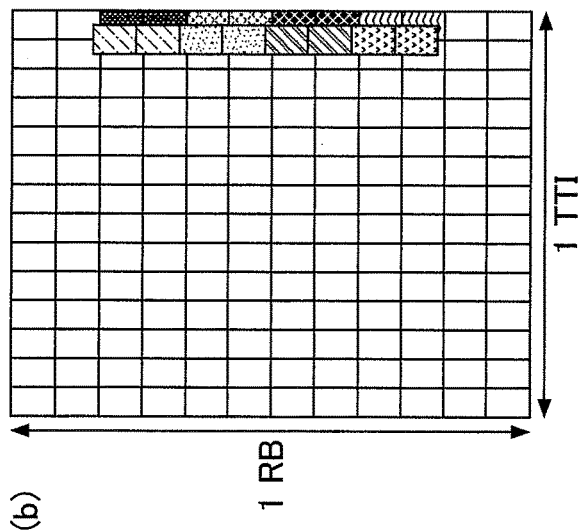
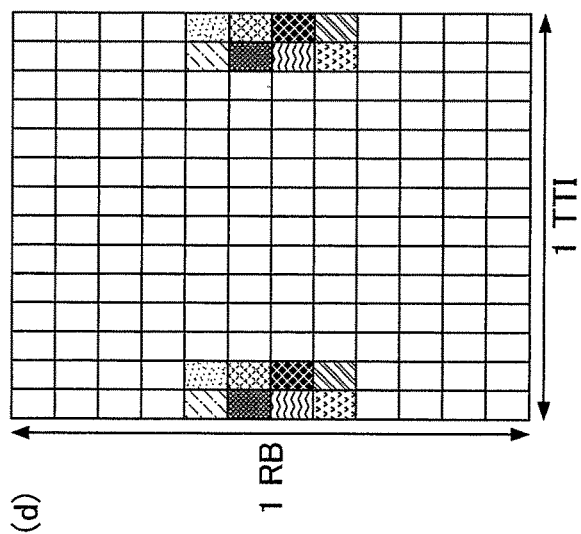
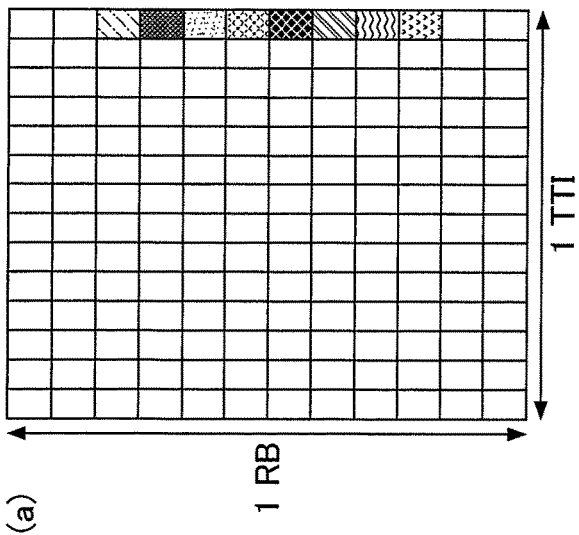
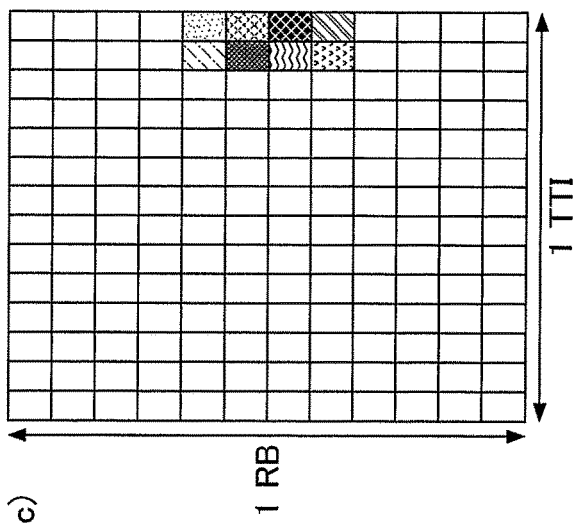

FIG.25
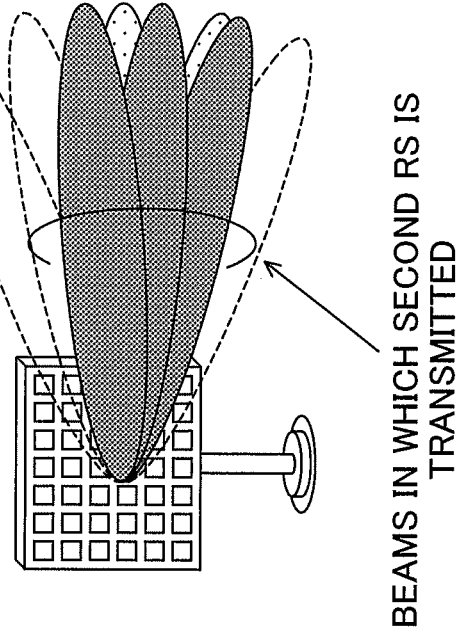
(b)
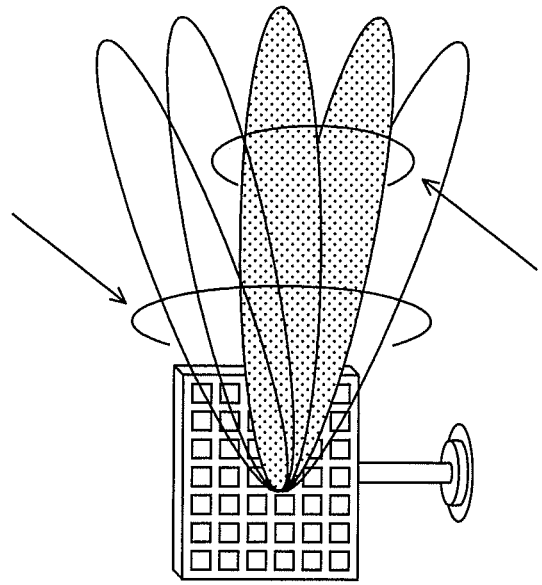
(a)

USER EQUIPMENT AND MEASUREMENT METHOD

TECHNICAL FIELD

The present invention relates to user equipment and measurement method.

BACKGROUND ART

In Long Term Evolution (LTE), in order to further increase a system capacity, further increase a data transmission rate, and further decrease delay in a radio section, a radio communication scheme called 5G is under review. In 5G, various radio technologies are under review in order to satisfy requirements that a delay of a radio section be 1 ms or less while realizing throughput of 10 Gbps or more. Since there is a high possibility that a radio technology different from LTE is employed in 5G, in 3GPP, a radio network supporting 5G is called as a new radio network (new radio access network (NewRAT)) to be distinguished from a radio network supporting LTE.

In 5G, it is assumed that a wide frequency ranging from a low frequency band similar to LTE to a higher frequency band than LTE is used. Particularly, since a propagation loss increases in a high frequency band, the application of massive Multi Input Multi Output (MIMO) in which beam forming with a narrow beam width is performed is under review to compensate for it. Massive MIMO is a large-scale MIMO in which a plurality of antenna elements (for example, 100 elements) are installed at a base station side, and it is possible to secure a coverage since it is possible to concentrate an electric field strength in a narrow region through beam forming.

CITATION LIST

Non-Patent Document

Non-Patent Document 1: NTT DoCoMo, Inc. "Docomo 5G White Paper," September 2014
Non-Patent Document 2: NTT DoCoMo, Inc. NTT DOCOMO Technical Journal "5G radio access technology," January 2016

SUMMARY OF THE INVENTION

Problem to be Solved by the Invention

Since massive MIMO forms a narrow beam using a plurality of antenna elements, it is necessary for the base station to select a beam in a direction in which the user equipment exists among a plurality of beam candidates. For this reason, in order to enable the base station to properly perform the beam selection, it is necessary to implement a configuration of a reference signal different from that of LTE (a reference signal mapping method, a transmission cycle, or the like) and appropriately feed back a measurement result for the reference signal from the user equipment.

In addition to massive MIMO, various radio technologies are under review in 5G, and for example, a technique of supporting various subcarrier spacings different from those of LTE is under review. In 5G, the introduction of a flexible subframe in which dynamic Time Division Duplex (TDD) is supported, and the use of a subframe (for DL, for UL, or the like) can be variously changed is under review. Therefore, when the configuration and the feedback method of the reference signal based on the beam forming are specified, it is necessary to consider the introduction of various radio technologies.

The technology of the disclosure has been made in light of the foregoing, and it is an object of the technology of the disclosure to provide a technique capable of enabling the user equipment to measure the reference signal and feed a measurement result back to the base station.

Means for Solving Problem

A user equipment according to the technology of the disclosure is a user equipment in a radio communication system including a base station and the user equipment, including a first measuring unit that measures a reception quality or channel information using a first reference signal transmitted in a time interval which is set periodically in a radio frame divided into predetermined time intervals, a second measuring unit that measures a reception quality or channel information using a second reference signal transmitted in a flexibly-selected time interval other than the time interval which is set periodically in the radio frame divided into the predetermined time intervals, and a reporting unit that reports the reception quality or the channel information measured using the first reference signal and the reception quality or the channel information measured using the second reference signal to the base station.

Effect of the Invention

According to the technology of the disclosure, a technique capable of enabling the user equipment to measure the reference signal and feed a measurement result back to the base station is provided.

BRIEF DESCRIPTION OF DRAWINGS

FIG. 1B is a diagram illustrating an example of a configuration of a massive MIMO base station which is under review in 5G;

FIG. 12 is a diagram illustrating a mapping example of second RSs;

FIG. 25 is a diagram for describing an exemplary operation;

MODE(S) FOR CARRYING OUT THE INVENTION

Hereinafter, an exemplary embodiment of the present invention will be described with reference to the appended drawings. An embodiment to be described below is merely an example, and an embodiment to which the present invention is applied is not limited to the following embodiment. For example, a radio communication system according to the present embodiment is assumed to be a system that supports LTE and 5G, but the present invention is not limited to LTE and 5G and applicable to other schemes. In this specification and claims set forth below, "LTE" is used in a broad sense including Releases 10, 11, 12, and 13 of 3GPP or a $5^{th}$ generation communication scheme corresponding to Release 14 or later in addition to communication schemes corresponding to Release 8 and 9 of 3GPP.

The following description will proceed with an example in which one antenna port correspond to a flexibly-selected one beam formed by beam forming. In this sense, a beam may be referred to as an "antenna port."

<Configuration of Massive MIMO Base Station>

Figure 1A:
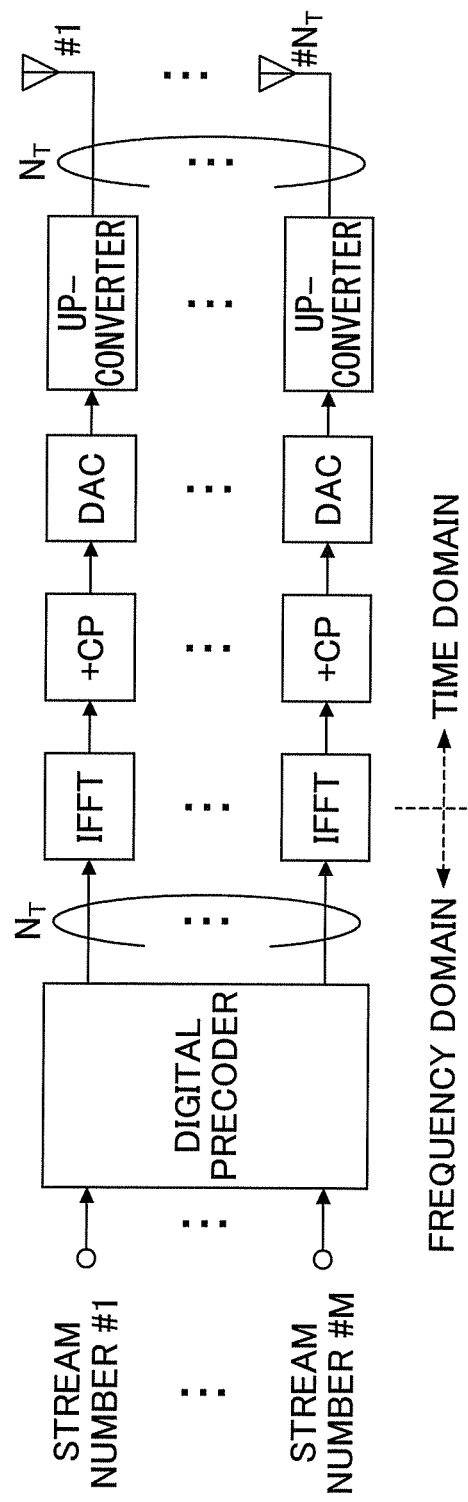
FIG. 1A is a diagram illustrating an example of a configuration of a massive MIMO base station which is under review in 5G.

Here, a configuration of the base station supporting massive MIMO which is under review in 5G will be described with reference to FIG. 1A and FIG. 1B.

Generally, a massive MIMO base station includes digital analog converters (DACs) and up-converters which are equal in number to transmitting antenna elements, and performs insertion inverse fast Fourier transform (IFFT) and insertion of a cyclic prefix (CP) in baseband signal processing as many time as the number of transmitting antenna elements. Such a massive MIMO base station is referred to as a full digital type massive MIMO base station (FIG. 1A).

The full digital type massive MIMO base station is expensive because the number of radio circuits is large. In this regard, a hybrid type massive MIMO base station in which only a beam forming (BF) process is implemented by a variable phase shifter in a radio frequency (RF) circuit, and a radio circuit is configured so that the BF process is common to all subcarriers is under review (FIG. 1B). In the hybrid type massive MIMO base station, since the BF processing is performed through an analog circuit, it is desirable to prepare DACs and up-converters that are equal in number to beams that are transmitted at the same time, and it is desirable to perform the IFFT and the insertion of the CP even in the baseband signal processing by the digital circuit as many times as the number of beams. Therefore, in the hybrid type massive MIMO base station, the cost can be reduced to be smaller than in the full digital type massive MIMO base station.

Further, as a simpler massive MIMO base station, an analog type massive MIMO base station that uses only analog BF by an analog circuit is also under review. Since the analog type massive MIMO base station does not require a digital precoding process, there is an advantage in that a circuit performing baseband processing can be simplified, but only one beam can be formed at a certain time.

<Configuration Radio Frame Under Review in 5G>

Next, a configuration of a radio frame which is under review in 5G will be described. In 5G, similarly to LTE, a radio frame configuration in which a time axis is divided into predetermined time intervals (subframes) is assumed to be used. In 5G, the introduction of a flexible subframe in which dynamic TDD is supported, and the use of a subframe (for DL, for UL, or the like) can be variously changed is under review.

Figure 2:
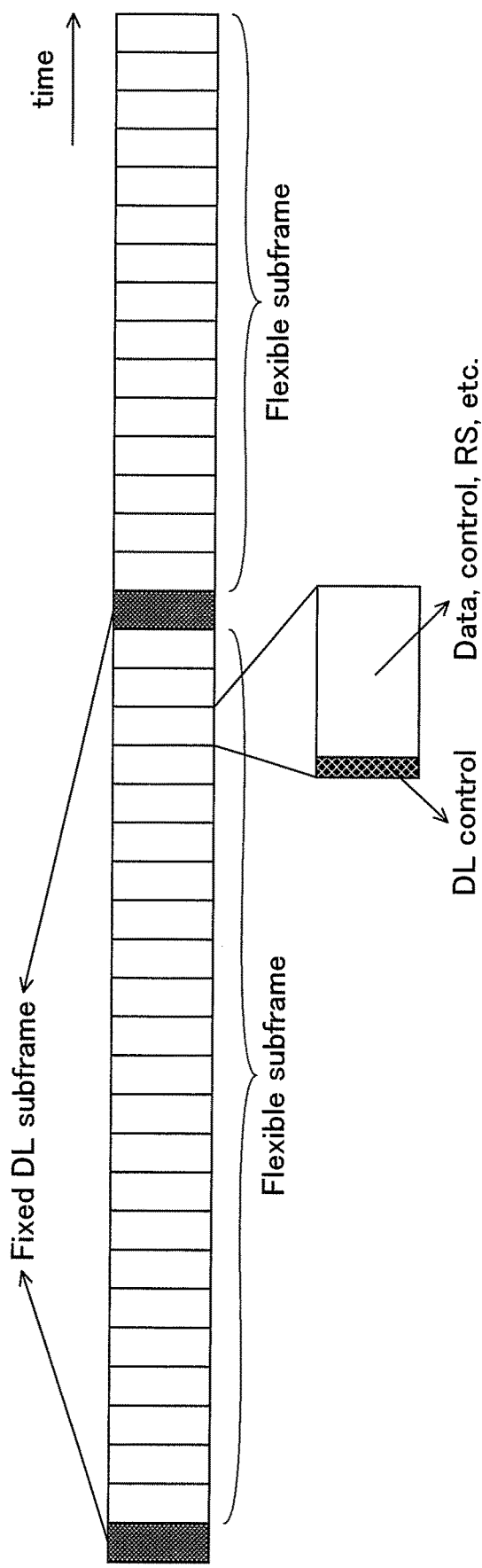
FIG. 2 is a diagram illustrating an example of a radio frame configuration which is under review in 5G.

FIG. 2 is a diagram illustrating an example of a radio frame configuration which is under review in 5G. As illustrated in FIG. 2, in the flexible subframe, information indicating the use of subframe (DL data, UL data, the reference signal, D2D data or the like) is included in a DL control channel mapped to the head of the subframe, so that the use of the subframe can be variously switched. It is under review to use the flexible subframe mainly for transmitting or receiving (unicasting or multicasting) signals or data signals destined for a specific user equipment UE.

Further, it is under review to set a fixed subframe (a fixed DL subframe) with a predetermined cycle as a periodical subframe for transmitting (broadcasting) signals which user equipments UE should receive for an initial connection such as a synchronization signal and broadcast information. It is under review to set the fixed subframe with a relatively longer cycle than the flexible subframe.

<Radio Parameters Under Review at 5G>

Figure 3:
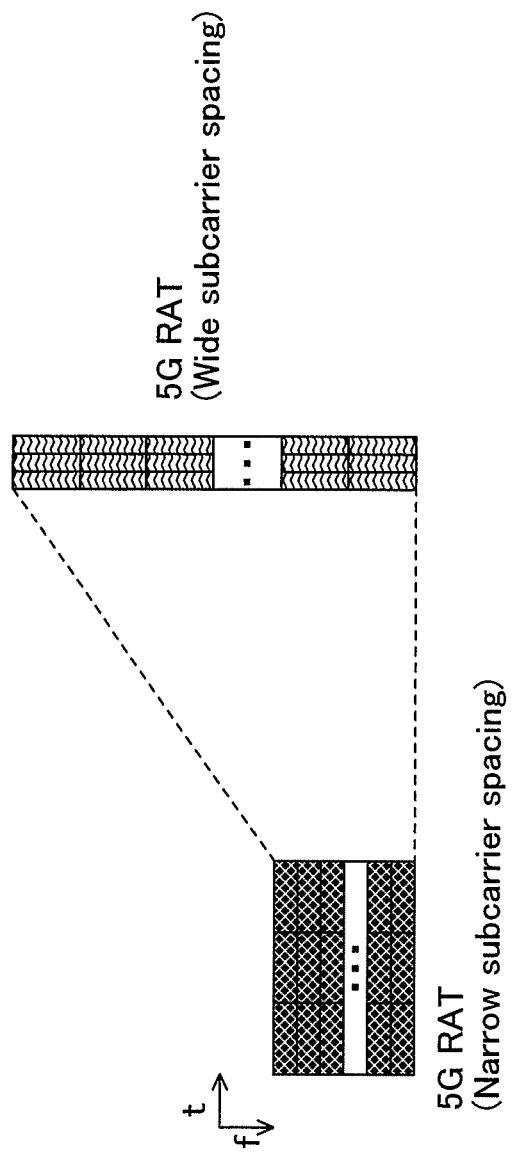
FIG. 3 is a diagram illustrating an example of a radio parameter which is under review in 5G.

Next, radio parameters which are under review in 5G will be described. In 5G, in order to implement a transmission rate of 10 Gbps or more, a high frequency is expected to be supported in addition to a wide band of several hundred MHz to 1 GHz or more. In this regard, as illustrated in FIG. 3, a technique of capable of variously changing radio parameters such as a subcarrier spacing and a symbol length is under review. An example on the right side of FIG. 3 is assumed to be applied to a carrier with a higher frequency than in an example on the left side of FIG. 3, and it is possible to increase resistance against a phase noise and reduce an OFDM symbol length instead by increasing the subcarrier spacing.

<System Configuration and Overview>

Figure 4:
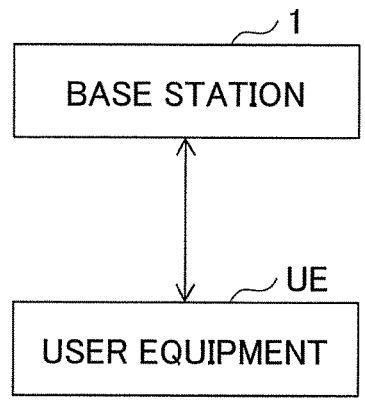
FIG. 4 is a diagram illustrating an example of a configuration of a radio communication system according to an embodiment.

FIG. 4 is a diagram illustrating an example of a configuration of a radio communication system according to an embodiment. As illustrated in FIG. 4, the radio communication system according to the embodiment includes a base station 1 and a user equipment UE. FIG. 4 illustrates one base station 1 and one user equipment UE, but it is an example, and a plurality of base stations 1 and a plurality of user equipment UE may be provided.

The user equipment UE has a function of communicating with the base station 1 and a function of measuring a DL reception quality and/or channel information using a reference signal transmitted from the base station 1 (hereinafter, referred to as an "RS") and reporting a measurement result to the base station 1.

The base station 1 supports massive MIMO and has a function of performing beam forming and communicating with the user equipment UE. Further, the base station 1 has a function of selecting an appropriate beam to be used for communication on the basis of the reception quality and/or the channel information reported from the user equipment UE. The base station 1 may be the full digital type massive MIMO base station, the hybrid type massive MIMO base station, or the analog type massive MIMO base station. The base station 1 according to the present embodiment need not necessarily support massive MIMO. The present embodiment may be a base station that does not support massive MIMO.

The base station 1 and the user equipment UE may support both LTE and NewRAT of 5G or may support only NewRAT of 5G.

The base station 1 and the user equipment UE support the radio frame configuration described in FIG. 2, and the base station 1 and the user equipment UE can communicate using the flexible subframe and the fixed subframe. Further, the base station 1 and user equipment UE can support various radio parameters described above with reference to FIG. 3.

<Processing Procedure>

Next, a processing procedure performed by the base station 1 and the user equipment UE according to the present embodiment will be described.

Figure 5:
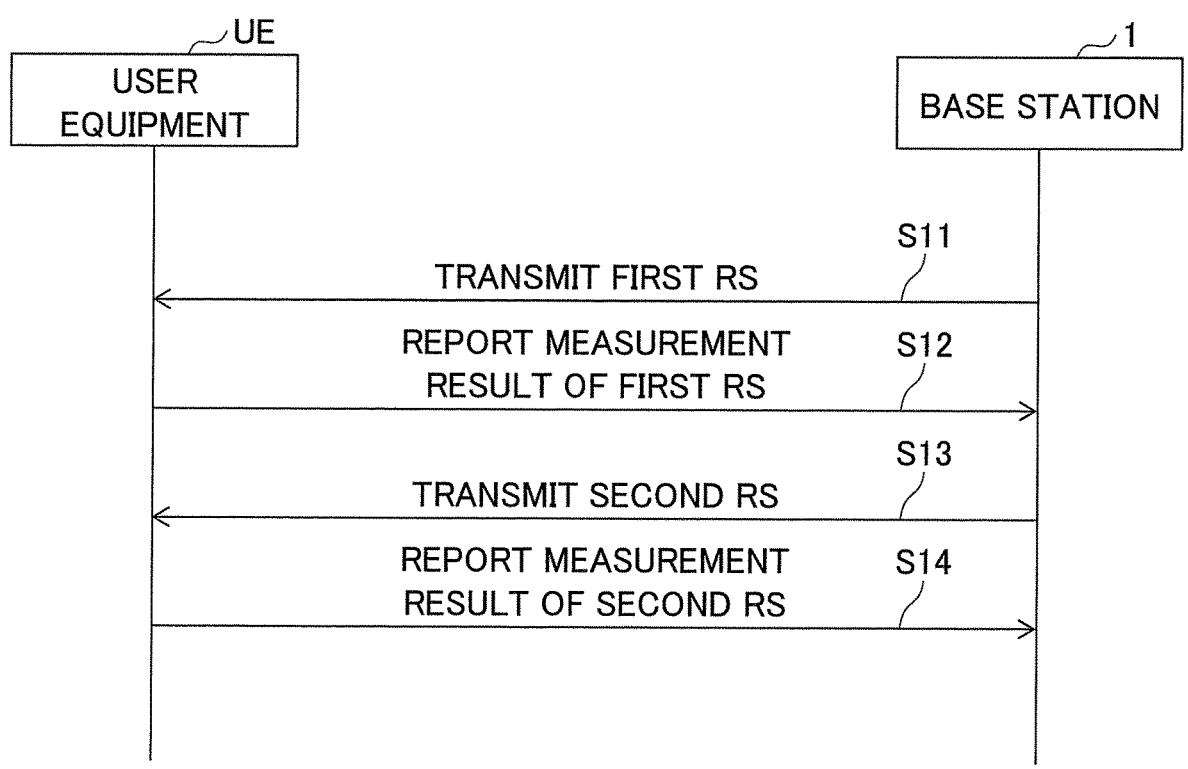
FIG. 5 is a sequence diagram illustrating an example of a processing procedure performed in a radio communication system according to an embodiment.

FIG. 5 is a sequence diagram illustrating an example of a processing procedure performed in the radio communication system according to the embodiment. In the present embodiment, a first RS and a second RS are used as the RS. The first RS and the second RS may be generated using different sequences or may be generated using the same sequence.

First, the base station 1 transmits the first RS in the fixed subframe (S11). Specifically, as will be described later, the first RS is an RS group in which RSs associated with different antenna ports are time-division-multiplexed (TDM) and then transmitted. In the following description, each of the RSs included in the RS group is also referred to as a "first RS."

The user equipment UE measures the reception quality and/or the channel state of the DL using the first RS received in the fixed subframe and reports the measurement result to the base station 1 (S12). More specifically, the user equipment UE measures the reception quality and/or the channel state of the DL for each first RS associated with each antenna port and reports the measurement result to the base station 1. The user equipment UE is assumed to detect a position of radio resources to which the first RSs are mapped (a mapping pattern of the first RSs) and a sequence of first RSs through an explicit notification or an implicit method from the base station 1 in accordance with a standard specification.

Then, the base station 1 selects the second RS to be transmitted to the user equipment UE on the basis of the reception quality and/or the channel state for each first RS associated with each antenna port which are reported from the user equipment UE, and transmits the selected second RS in the flexible subframe (S13). Specifically, as will be described later, the second RS is a group of RSs which are associated with antenna ports different from the antenna ports associated with the first RS. In the following description, each of the RSs included in the RS group is also referred to as a "second RS." Unlike the first RS, the second RS is variously multiplexed using frequency-division multiplexing (FDM), code-division multiplexing (CDM), or time-division multiplexing (TDM) and then transmitted.

Then, the user equipment UE measures the reception quality and/or the channel state of the DL using the second RS received in the flexible subframe and reports the measurement result to the base station 1 (S14). More specifically, the user equipment UE measures the reception quality and/or the channel state of the DL for each second RS associated with each antenna port and reports the measurement result to the base station 1. The user equipment UE is assumed to detect a position of radio resources to which the second RS is mapped (a mapping pattern of the second RSs) and a sequence of first RSs through an explicit notification or an implicit method from the base station 1 in accordance with a standard specification.

Then, the base station 1 selects an appropriate beam used for communication with the user equipment UE on the basis of the reception quality and/or the channel state of each second RS associated with each antenna port which are reported from the user equipment UE, and communicates with the user equipment UE using the selected beam.

<First RS>

(Mapping Pattern Example of First RS)

Next, the mapping pattern of the first RSs indicating the position of the radio resources to which the first RSs corresponding to the respective antenna ports are mapped will be described in detail. As described above, the first RS is transmitted in the fixed subframe. In other words, the first RS is transmitted (broadcast) in common to all user equipment UEs within the cell.

Figure 6:
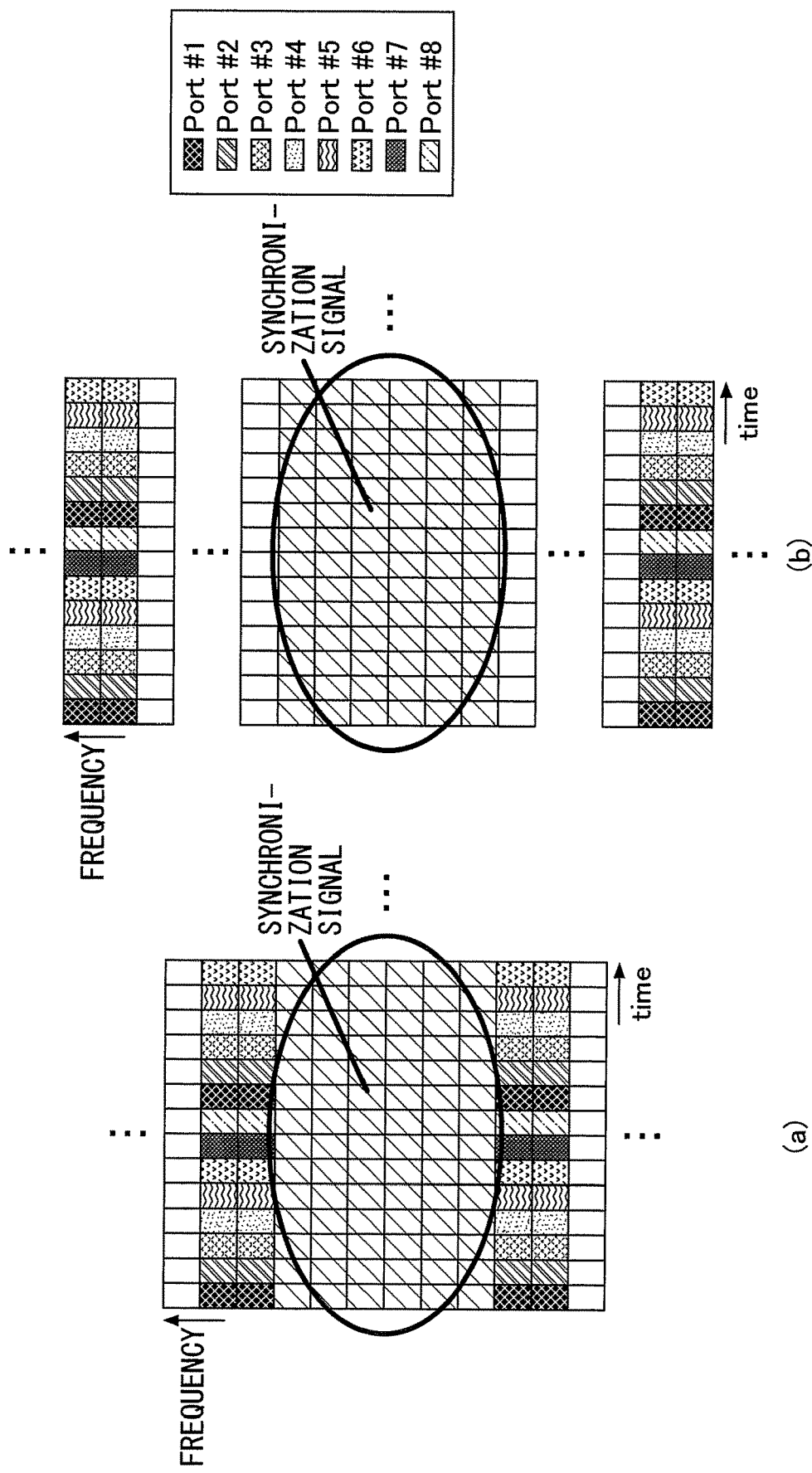
FIG. 6 is a diagram illustrating a mapping example of first RSs.

FIG. 6 is a diagram illustrating the mapping example of the first RSs. One grid illustrated in FIG. 6 (similarly in FIGS. 7 to 9) intends radio resources configured with one subcarrier and one symbol (corresponding to resource elements of LTE) but is not necessarily limited thereto. A time axis of one grid illustrated in FIG. 6 may be a plurality of symbols or one subframe. When the time axis of one grid is the subframe, the first RSs are consecutively transmitted through a plurality of subframes, and thus the fixed subframe is also similarly consecutive in a plurality of subframes. Further, a frequency axis of one grid illustrated in FIG. 6 may be a plurality of subcarriers, one or more resource blocks (RBs), or another unit.

In the first RS, RSs corresponding to antenna ports (antenna ports #1 to #8 in the example of FIG. 6) are time-division-multiplexed (TDM) and transmitted. In other words, the base station 1 transmits the first RSs while sequentially switching the antenna ports over time. This is because the base station 1 is supposed to transmit the first RS corresponding to each beam while sequentially switching the beam direction (phase) transmitted by analog beam forming over time. In the case of the hybrid type massive MIMO base station and the full digital type massive MIMO base station, it is possible to generate a plurality of beams at a certain time. Therefore, the first RS is not limited to the case in which the first RS is completely time-division-multiplexed for each antenna port and transmitted, and RSs corresponding to a plurality of antenna ports may be frequency-division-multiplexed at a certain time. Each user equipment UE need not recognize a configuration of beam forming.

FIG. 6(a) illustrates an example in which the RSs corresponding to the same antenna port are frequency-division-multiplexed and mapped to resources above and below the synchronization signal, and FIG. 6(b) illustrates an example in which the RSs corresponding to the same antenna port are frequency-division-multiplexed and mapped to resources above and below the synchronization signal at positions deviated from the synchronization signal by a predetermined frequency. The synchronization signal is supposed to be transmitted at the center of the system bandwidth, similarly to LTE, but the present invention is not necessarily limited thereto. The present embodiment can also be applied even when the synchronization signal is transmitted at a position deviated from the center of the system bandwidth. At the same time, the antenna port from which the synchronization signal is transmitted and an antenna port from which the first RS is transmitted may be the same. For example, the synchronization signal transmitted at a time at which the first RS is transmitted from the antenna port #1 may be the synchronization signal transmitted from the antenna port #1.

The mapping pattern of the first RSs may be changed (shifted) at a certain time with a transmission cycle. For example, it can be implemented by making it possible to calculate the order in which the first RSs are mapped in each transmission cycle from a predetermined index value that changes (shifts) with the transmission cycle. The predetermined index value may be, for example, a subframe number and/or a system frame number (SFN).

Figure 7:
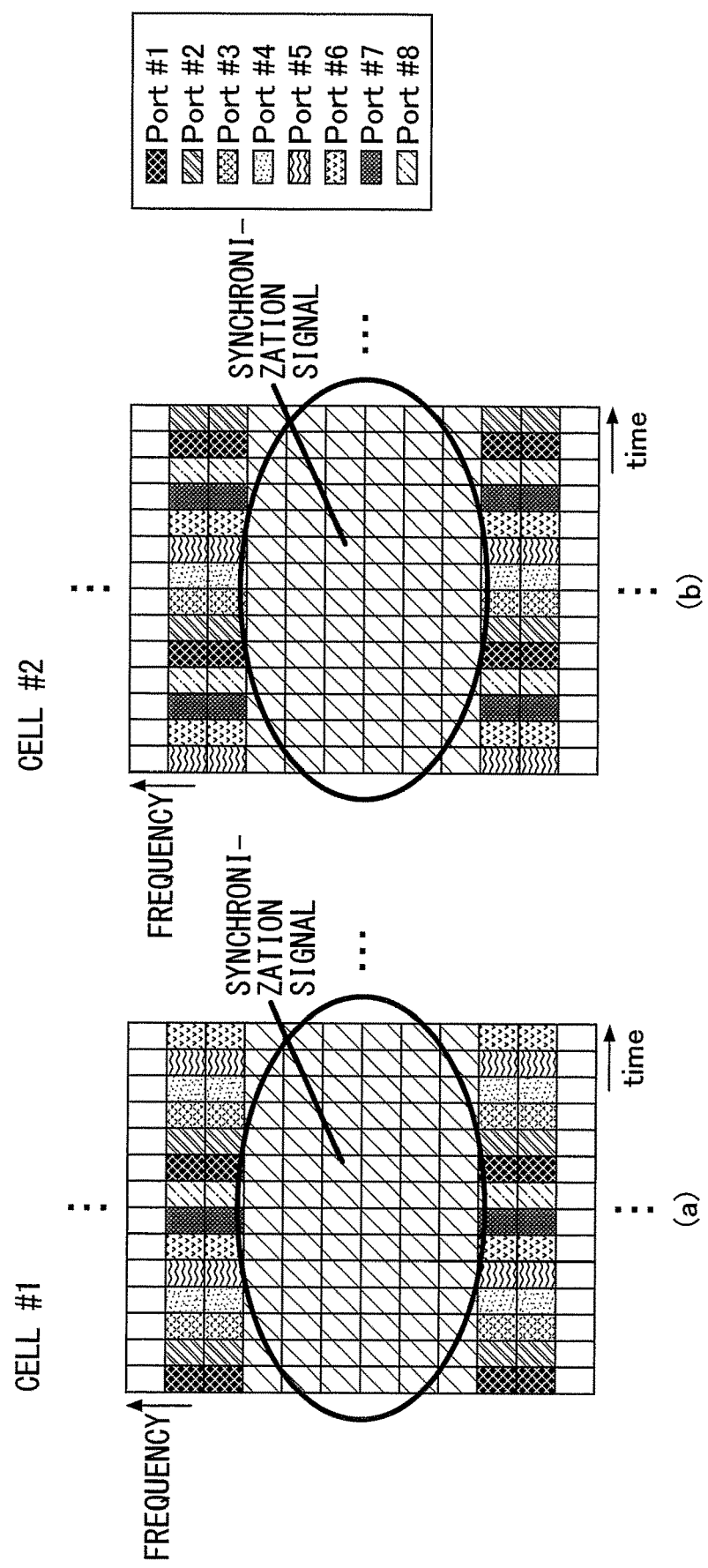
FIG. 7 is a diagram illustrating a mapping example of the first RSs.

Further, at a certain time, the mapping pattern of the first RSs may be the same or may be made different between cells. An example of the case in which the mapping pattern of the first RSs is different between cells is illustrated in FIG. 7. FIG. 7(a) illustrates a mapping example in a cell #1, and FIG. 7(b) illustrates mapping example in a cell #2. In the case in which the mapping pattern of the first RSs differs between the cells at a certain time, for example, it can be implemented by making it possible to calculate the position of the radio resources to which the first RSs are mapped in each transmission cycle from a predetermined index and a cell ID that changes (shifted) with the transmission cycle.

Figure 8:
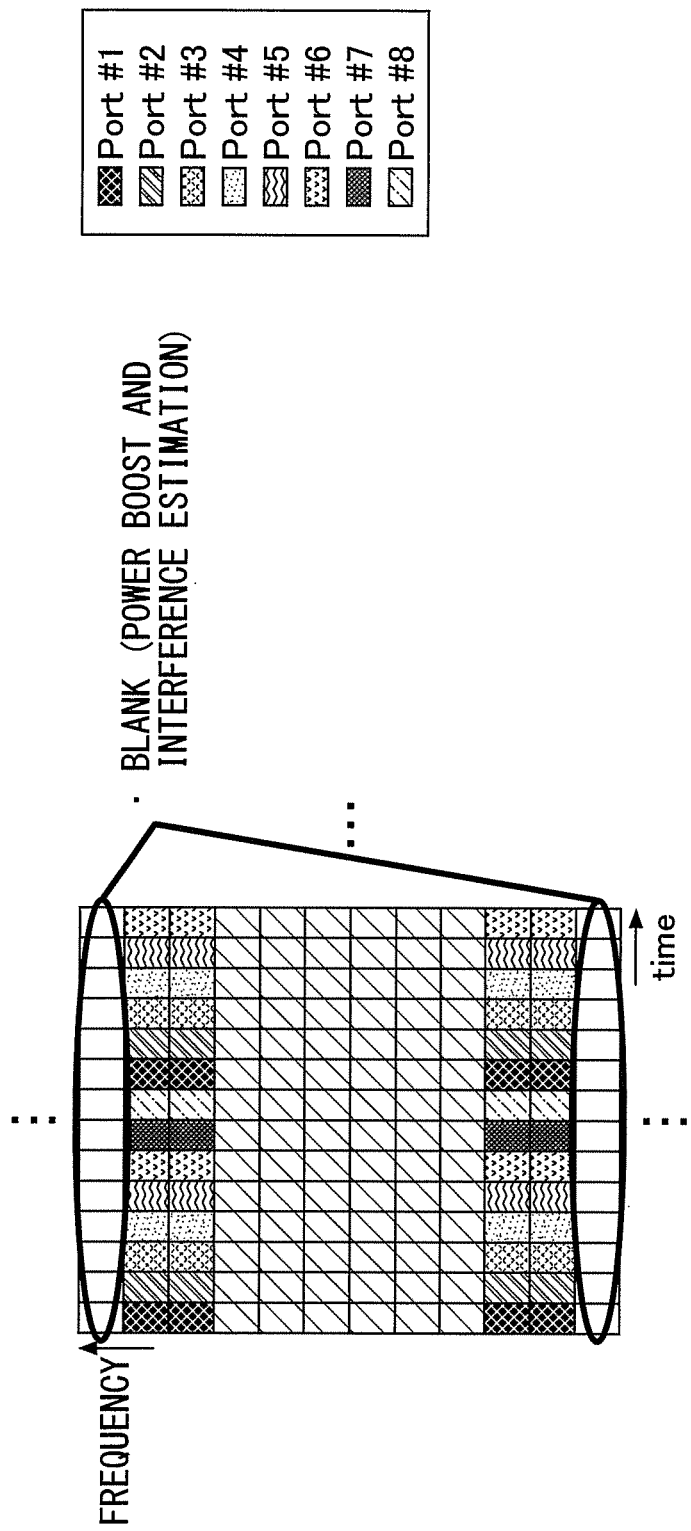
FIG. 8 is a diagram for describing the use of resources to which the first RS is not mapped.

Further, as illustrated in FIG. 8, resources to which the first RS is not mapped (that is, resources in which a radio signal is not transmitted) may be blank. In this case, the base station 1 may boost the transmission power of the first RS using surplus transmission power obtained by setting blank resources for transmission of the first RS. Further, the user equipment UE may estimate an interference wave in blank resources. When the blank resources are set at different positions between cells, the user equipment UE can measure the interference waves from other cells in a blank cell.

Figure 9:
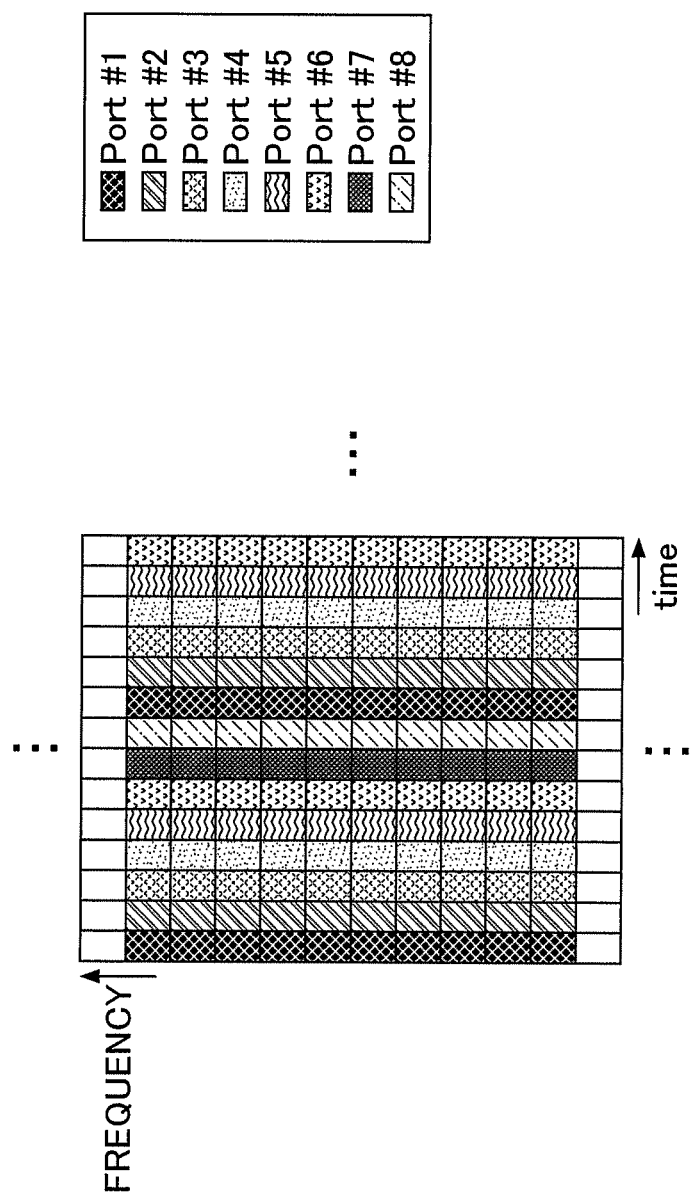
FIG. 9 is a diagram illustrating a mapping example of the first RSs doubling as a synchronization signal.

The first RS may double as the synchronization signal. The mapping example of the first RSs in this case is illustrated in FIG. 9. In this case, the first RS can be mapped to the center of the system bandwidth, and since it is not necessary to transmit both the synchronization signal and the first RS mainly on the base station 1 side, the processing overhead of the base station 1 side can be reduced.

(Transmission Cycle of First RS)

The transmission cycle of the first RS may be specified in a standard specification or may be reported (set) from the base station 1 to the user equipment UE using broadcast information or a signaling message specific to the user equipment UE (for example, an RRC message). Further, the transmission cycle of the first RS may be reported (set) from the base station 1 to the user equipment UE using MAC signaling or physical layer (PHY) signaling.

The base station 1 may change the transmission cycle of the first RS by transmitting the first RS in a part of the fixed subframe other than the entire fixed subframe or may change the transmission cycle of the first RS by changing the transmission interval of the fixed subframe.

Figure 10:
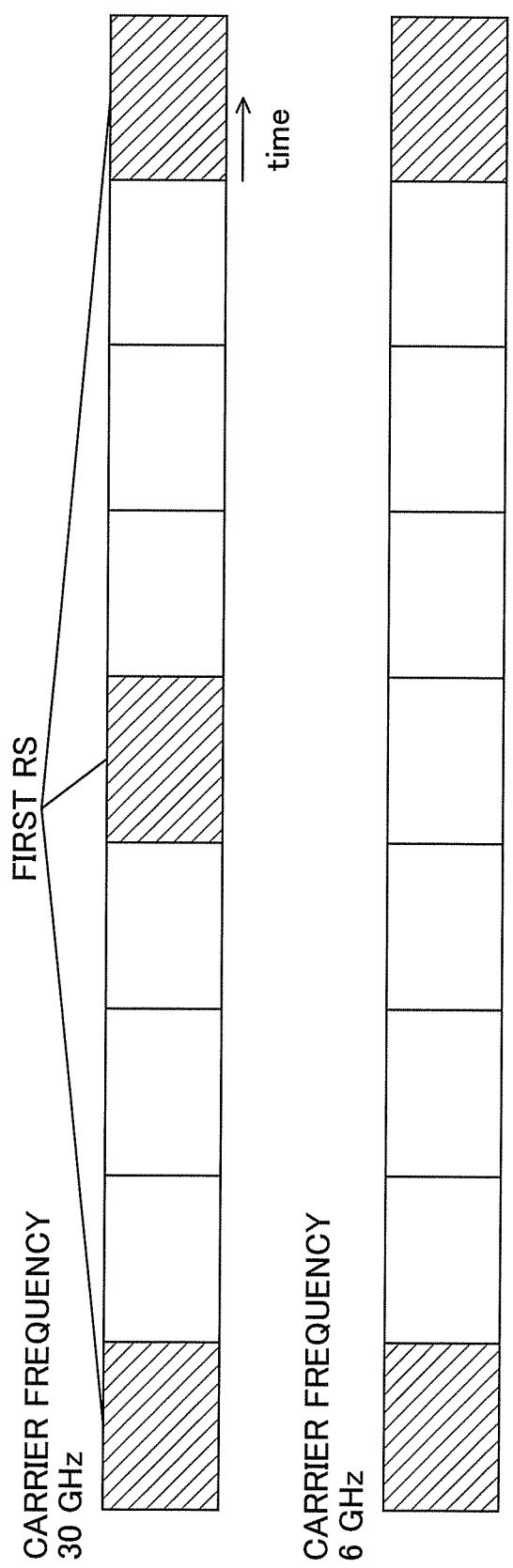
FIG. 10 is a diagram illustrating an example of a transmission cycle of the first RS.

The transmission cycle of the first RS may be set in accordance with a carrier frequency, a subcarrier spacing, an average moving speed of the user equipment UE assumed in a carrier, and/or the like. FIG. 10 illustrates an example in which different transmission cycles are set in a carrier with a carrier frequency of 30 GHz and a carrier with a carrier frequency of 6 GHz. In this case, the user equipment UE may recognize the transmission cycle of the first RS by a notification (setting) from the base station 1 or implicitly recognize on the basis of a system bandwidth, a carrier frequency, or the like.

Further, the base station 1 may dynamically change the transmission cycle of the first RS, for example, such that the transmission cycle of the first RS is set to 10 ms in a certain period and set to 5 ms in the next period or may semi-statically change the transmission cycle on the basis of a predetermined trigger. In this case, the base station 1 may notify the user equipment UE the transmission cycle and the period to which the transmission cycle in advance or may set the changed transmission cycle in the user equipment UE using the broadcast information or the signaling message specific to the user equipment UE (for example, the RRC message).

Figure 11:
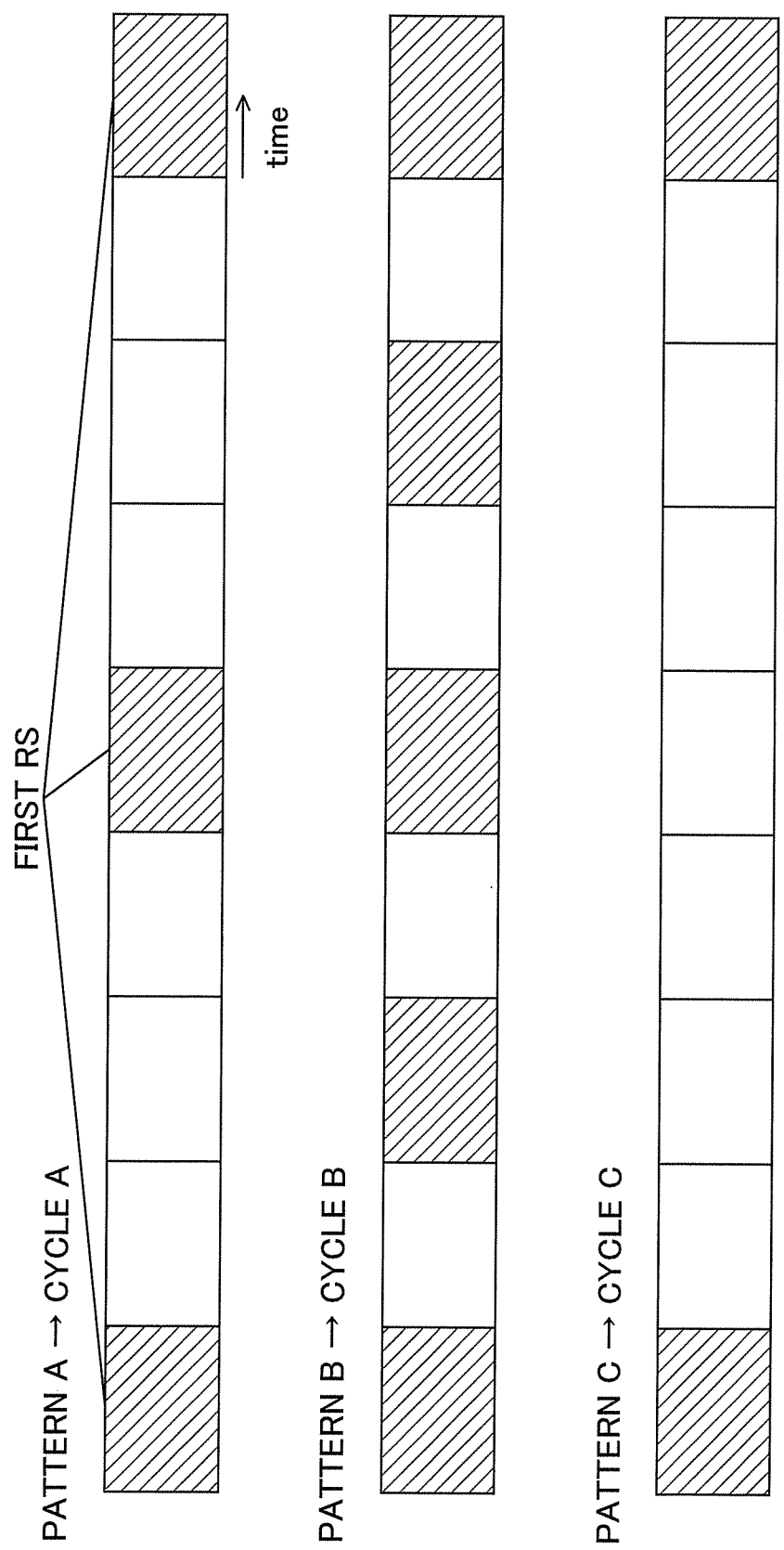
FIG. 11 is a diagram illustrating an example of the transmission cycle of the first RS.

As illustrated in FIG. 11, a plurality of cycle patterns may be specified in advance as the transmission cycle of the first RS, and the base station 1 may transmit the first RS in any one cycle pattern. In this case, in order to enable the user equipment UE to blind detect the cycle pattern in which the first RS is transmitted, for example, the first RSs may be transmitted using a different sequence in each of a plurality of cycle patterns. As a result, the user equipment UE can blind detect the cycle pattern in which the first RS is transmitted by specifying the sequence of first RSs.

(Setting of Mapping Pattern of First RSs)

The mapping pattern of the first RSs may be specified in a standard specification or may be reported (set) from the base station 1 to the user equipment UE using the broadcast information or the signaling message specific to the user equipment UE (for example, the RRC message). Further, the mapping pattern of the first RSs may be reported (set) from the base station 1 to the user equipment UE through the MAC signaling or the PHY signaling. The sequence of first RSs may also be specified in a standard specification or may be notified (set) from the base station 1 to the user equipment UE using the broadcast information or the signaling message specific to the user equipment UE (for example, the RRC message). Further, the sequence of first RSs may be reported (set) from the base station 1 to the user equipment UE using the MAC signaling or the PHY signaling.

The mapping pattern may be set to differ in accordance with the carrier frequency, the subcarrier spacing, the average moving speed of the user equipment UE assumed in the carrier, and/or the like.

Further, the base station 1 may dynamically change the mapping pattern, for example, such that a mapping pattern A is set in a certain period, and a mapping pattern B is set in a next period or may semi-statically change the mapping pattern on the basis of a predetermined trigger. In this case, the base station 1 may notify the user equipment UE of the mapping pattern and the period to which the mapping pattern is applied in advance or may set the changed mapping pattern in the user equipment UE using the broadcast information or the signaling message specific to the user equipment UE (for example, the RRC message).

Further, a plurality of mapping patterns may be specified in advance as the mapping pattern of the first RSs, and the base station 1 may transmit the first RS in any one mapping pattern. In this case, for example, the first RSs are transmitted using a different sequence in each of a plurality of mapping patterns so that the user equipment UE can blind detect the mapping pattern in which the first RS is transmitted. As a result, the user equipment UE can blind detect the mapping pattern in which the first RS is transmitted by specifying the sequence of first RSs.

(Report of Measurement Result)

In the processing procedure of step S12 in FIG. 5, the user equipment UE measures the DL reception quality and/or the channel state for each first RS associated with each antenna port and reports the measurement result to the base station 1 using an uplink control channel (uplink control information (UCI)). The user equipment UE may collectively report the measurement results for all the antenna ports to the base station 1 or may appropriately report the measurement result for each antenna port for which the measurement has been completed. The reception quality may be an RSRQ, an RSRP, an RSSI, or an SINR or some or all thereof.

Further, the user equipment UE may report only the measurement results corresponding to some antenna ports to the base station 1 without reporting all the measurement results corresponding to all the antenna ports to the base station 1. In this case, an instruction indicating an antenna port of a report target may be explicitly given from the base station 1 to the user equipment UE, or the user equipment UE may select the antenna port of the report target. In the latter case, the user equipment UE may report the reception quality for only the antenna ports whose reception quality is a predetermined threshold value or more.

Further, the user equipment UE may report an average value of the measurement results in a predetermined time interval to the base station 1. For example, in the case in which the first RS is transmitted with a cycle of 10 ms, when a predetermined time interval is 30 ms, the user equipment UE measures the DL reception quality and/or the channel state of each first RS associated with each antenna port over 3 cycles and report the average value of measured reception quality and/or the channel state of each antenna port to the base station 1 for each antenna port.

The length of the predetermined time interval may be specified in a standard specification or may be set (reported) from the base station 1 to the user equipment UE using the broadcast information or the signaling message specific to the user equipment UE (for example, the RRC message). Further, the length of the predetermined time interval may be reported (set) from the base station 1 to the user equipment UE using the MAC signaling or the PHY signaling.

Further, the length of the predetermined time interval may be set to differ in accordance with the carrier frequency, the subcarrier spacing, the average moving speed of the user equipment UE assumed in the carrier, or the like.

Further, the length of the predetermined time interval may be dynamically changed, for example, such that the length of the predetermined time interval is set to "30 ms" in a certain period and "50 ms" in the next period or may be semi-statically changed based on a predetermined trigger.

A plurality of patterns may be specified in advance as a length of a predetermined time interval so that the user equipment UE side may blind detect the pattern in which the measurement results are averaged and reported. For example, the first RSs may be transmitted using a different sequence in each of a plurality of patterns. Thus, the user equipment UE can specify the sequence of first RSs and blind detect the pattern in which the measurement results are average and reported.

Further, the user equipment UE may select the length of the predetermined time interval in which the measurement results are averaged. Further, when the user equipment UE selects the antenna port of the report target and the predetermined time interval, the user equipment UE may narrow down the antenna ports in which the first RS is measured in advance by measuring the reception quality using the synchronization signal transmitted in the fixed subframe. In this case, the synchronization signal needs to be transmitted in association with each antenna port.

<Second RS>

(Mapping Pattern Example of Second RSs)

Next, the mapping pattern of the second RSs indicating the position of the radio resources to which the second RSs corresponding to the respective antenna ports are mapped will be described in detail. As described above, the second RS is transmitted in the flexible subframe. The second RS may be individually transmitted (unicast) to each user equipment UE or may be broadcasted in common to all the user equipment UEs in the cell.

FIG. 12 is a diagram illustrating the mapping example of the second RSs. For the second RSs, the RSs corresponding to the respective antenna ports (the antenna ports #9 to #16 in the example of FIG. 12) different from those of the first RSs are frequency-division-multiplexed (FDM), code-division multiplexed (CDM) and/or time-division-multiplexed (TDM) and transmitted in the unit area. The unit area is assumed to be an area surrounded by one RB in the frequency direction and one TTI in the time direction but not limited thereto and may be an area surrounded by a plurality of RBs in the frequency direction and a plurality of TTIs in the time direction. FIG. 12(*a*) illustrates an example in which the second RSs are frequency-division-multiplexed, FIG. 12(*b*) illustrates an example in which the second RSs are frequency-division-multiplexed and code-division-multiplexed, FIG. 12(*c*) illustrates an example in which the second RSs are frequency-division-multiplexed and code-division-multiplexed, and FIG. 12(*d*) illustrates an example in which the second RSs illustrated in FIG. 12(*c*) are time-division-multiplexed twice or more.

The mapping pattern of the second RSs may be changed (shifted) at a certain time with a transmission cycle. For example, it can be implemented by making it possible to calculate the order in which the second RSs are mapped in each transmission cycle from a predetermined index value that changes (shifts) with the transmission cycle. The predetermined index value may be, for example, a subframe number and/or an SFN.

Figure 13:
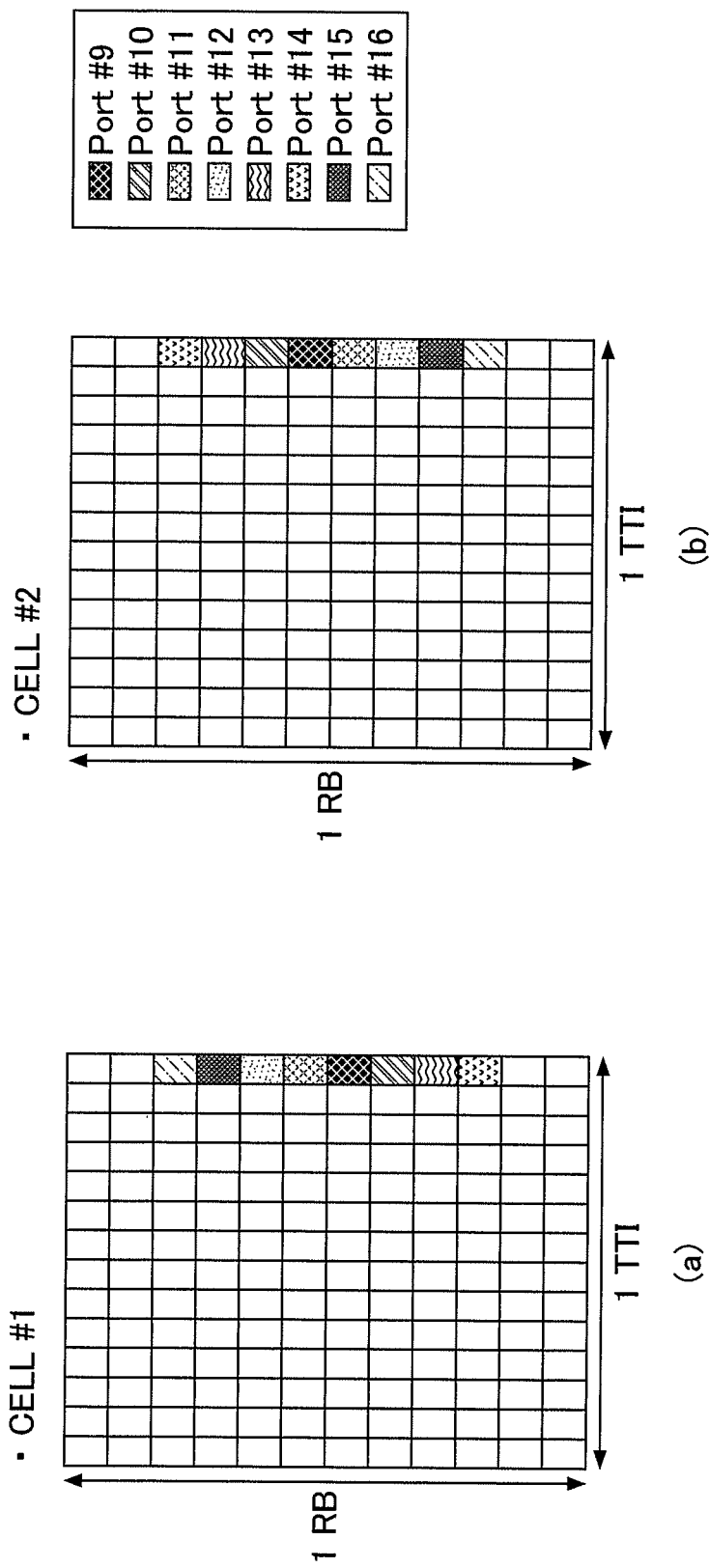
FIG. 13 is a diagram illustrating a mapping example of the second RSs.

Further, at a certain time, the mapping pattern of the second RSs may be the same or may be made different between cells. FIG. 13 illustrates an example in which the order in which the second RSs corresponding to the respective antenna ports are mapped in each transmission cycle differs between cells. FIG. 13(a) illustrates a mapping example in a cell #1, and FIG. 13(b) illustrates a mapping example in a cell #2. In the case in which the mapping pattern of the second RSs differs between the cells at a certain time, for example, it can be implemented by making it possible to calculate the position of the radio resources to which the second RSs are mapped in each transmission cycle from a predetermined index and a cell ID that changes (shifted) with the transmission cycle.

Figure 14:
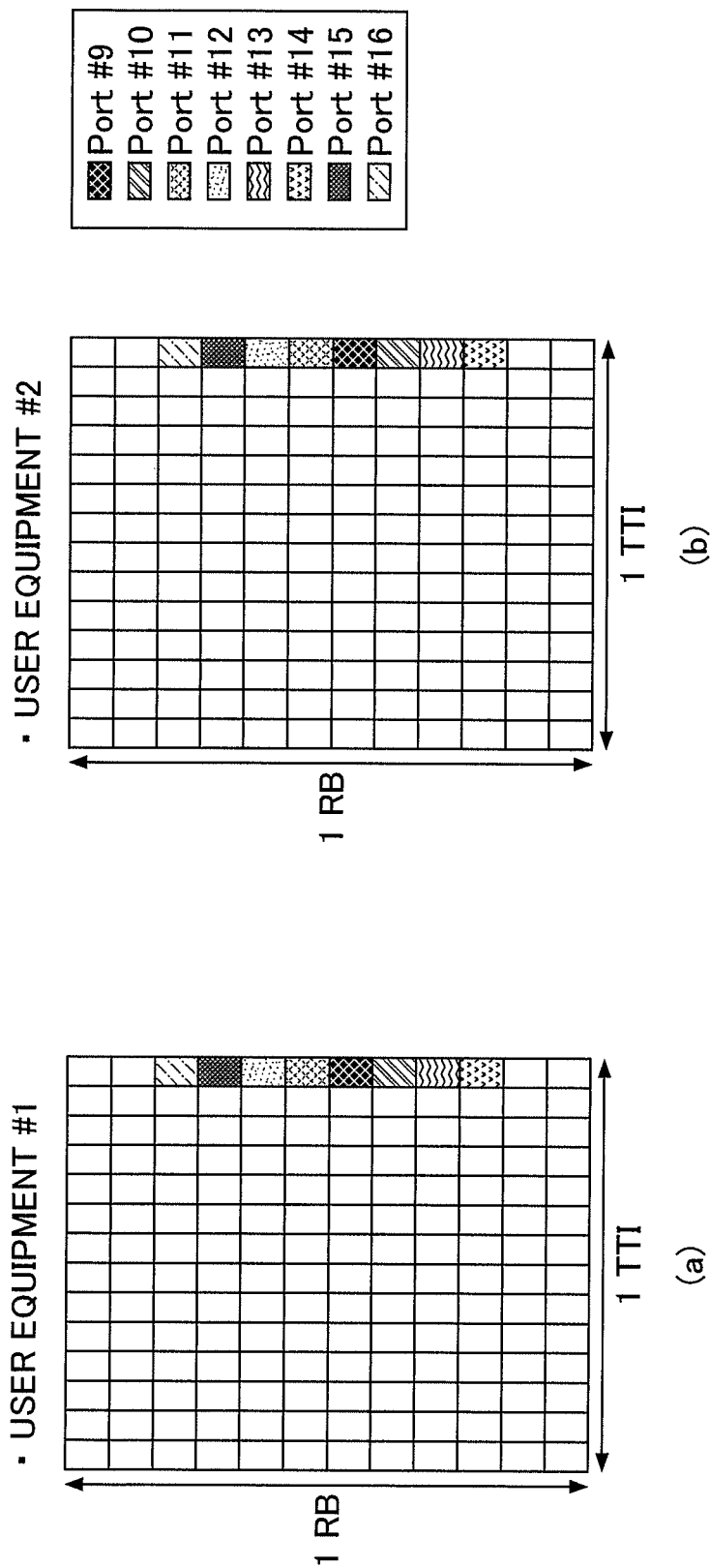
FIG. 14 is a diagram illustrating a mapping example of the second RSs.
Figure 15:
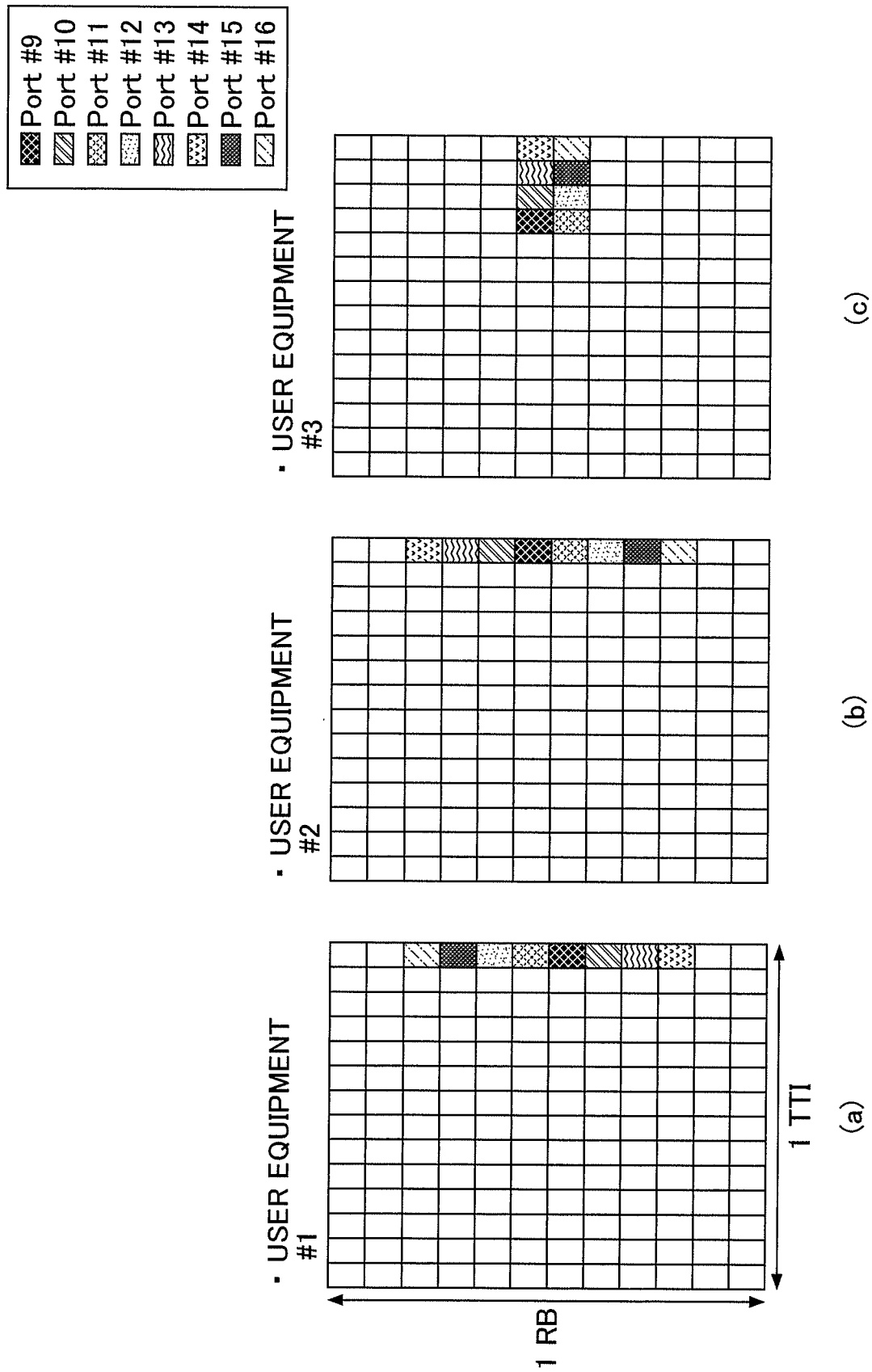
FIG. 15 is a diagram illustrating a mapping example of the second RSs.

Further, the mapping pattern of the second RSs may be common within the cell or may differ in accordance with each user equipment UE. FIG. 114 illustrates an example in which the mapping pattern of the second RSs is common within the cell, FIG. 14(a) illustrates the mapping pattern of the second RSs destined for the user equipment UE #1, and FIG. 14(b) illustrates the mapping pattern of the second RSs destined for the user equipment UE #2. FIG. 15 illustrates an example in which the mapping pattern of the second RSs differs in accordance with each user equipment UE, FIG. 15(a) illustrates the mapping pattern of the second RSs destined for the user equipment UE #1, FIG. 15(b) illustrates the mapping pattern of the second RSs destined for the user equipment UE #2, and FIG. 15(c) illustrates the mapping pattern of the second RSs destined for the user equipment UE #3.

Figure 16:
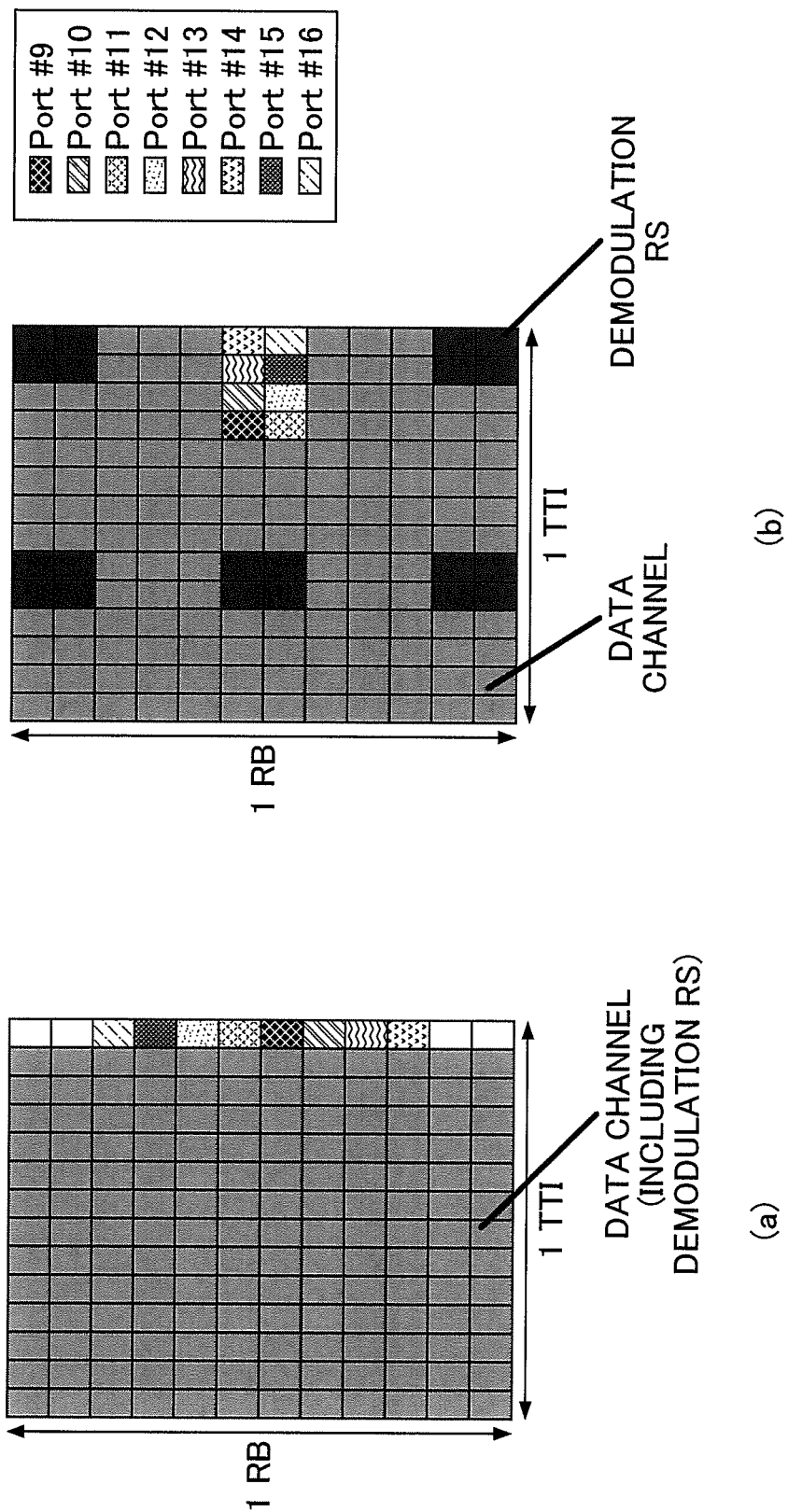
FIG. 16 is a diagram illustrating a mapping example when the second RS is multiplexed in a time interval including a data channel.

In the flexible subframe, in the unit area to which the second RS is mapped, only the second RSs may be transmitted, or the second RS and the downlink data channel may be multiplexed. In the case in which the second RS and the downlink data channel are multiplexed, a symbol to which the data channel is mapped and a symbol to which the second RS is mapped are clearly distinguished within a corresponding region as illustrated in FIG. 16(a), or the symbol to which the data channel is mapped and the symbol to which the second RS is mapped may be mixed as illustrated in FIG. 16(b). In the case in which the second RS and the downlink data channel are multiplexed, the second RS may be mapped to a symbol in the second half among a plurality of symbols in the unit area, for example, at least the last symbol. As a result, the user equipment UE can decode the data channel before the measurement of the second RS, and thus it is possible to reduce the transmission delay of the DL.

Here, in the case in which the unit area to which the second RS is mapped is multiplexed with the downlink data channel, the resource position of the demodulation RS (DMRS) to be mapped to the downlink data channel is considered to overlap the resource position to which the second RS is mapped. In this regard, in the present embodiment, the resource position of the demodulation RS and the resource position of the second RS may be specified to be separated not to overlap each other, or at the time of overlapping, an RS mapping method may be changed in accordance with a predetermined rule while permitting overlapping. The change rule at the time of overlapping may be specified in advance, or a notification of the change rule may be given through signaling. The signaling may be a method of indexing a plurality of change rules and notifying values thereof.

Figure 17:
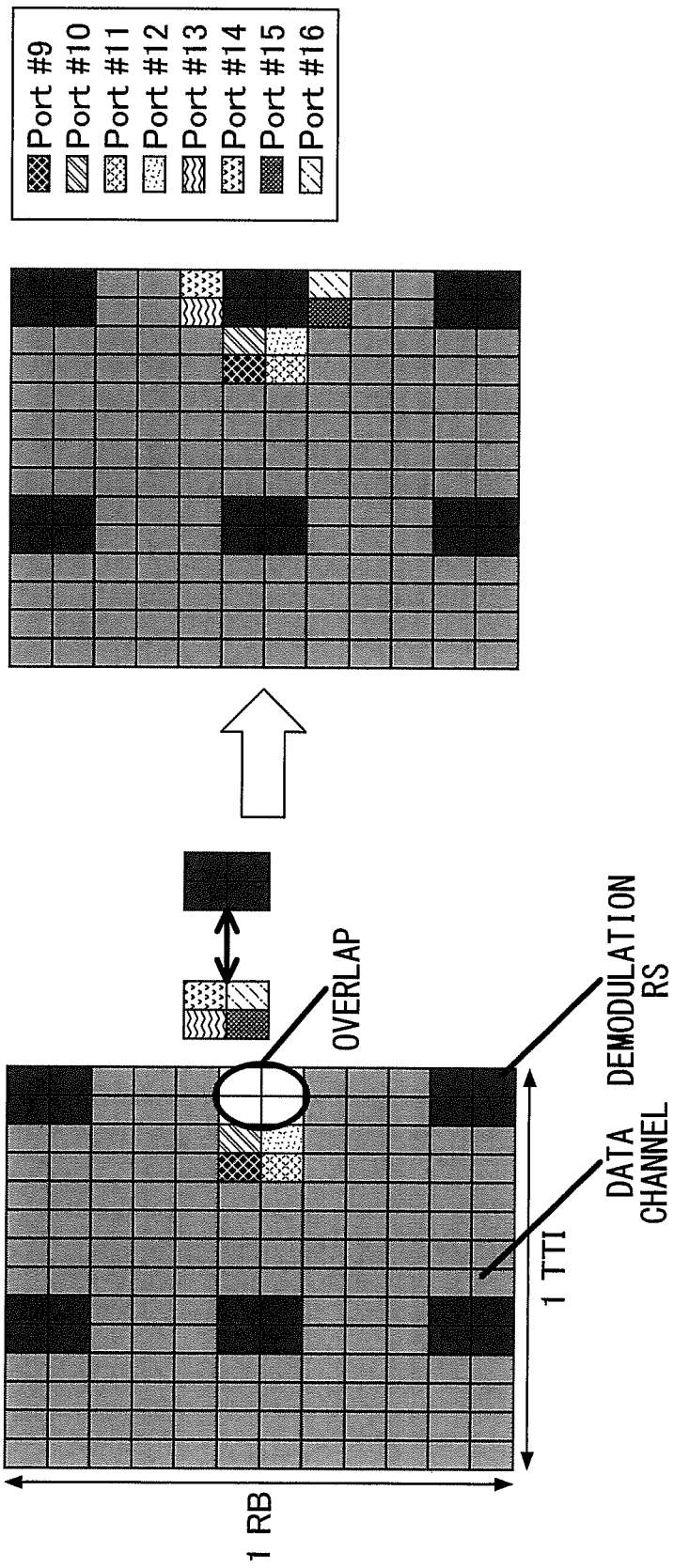
FIG. 17 is a diagram illustrating a mapping example when the second RS is multiplexed in a time interval including a data channel.
Figure 18:
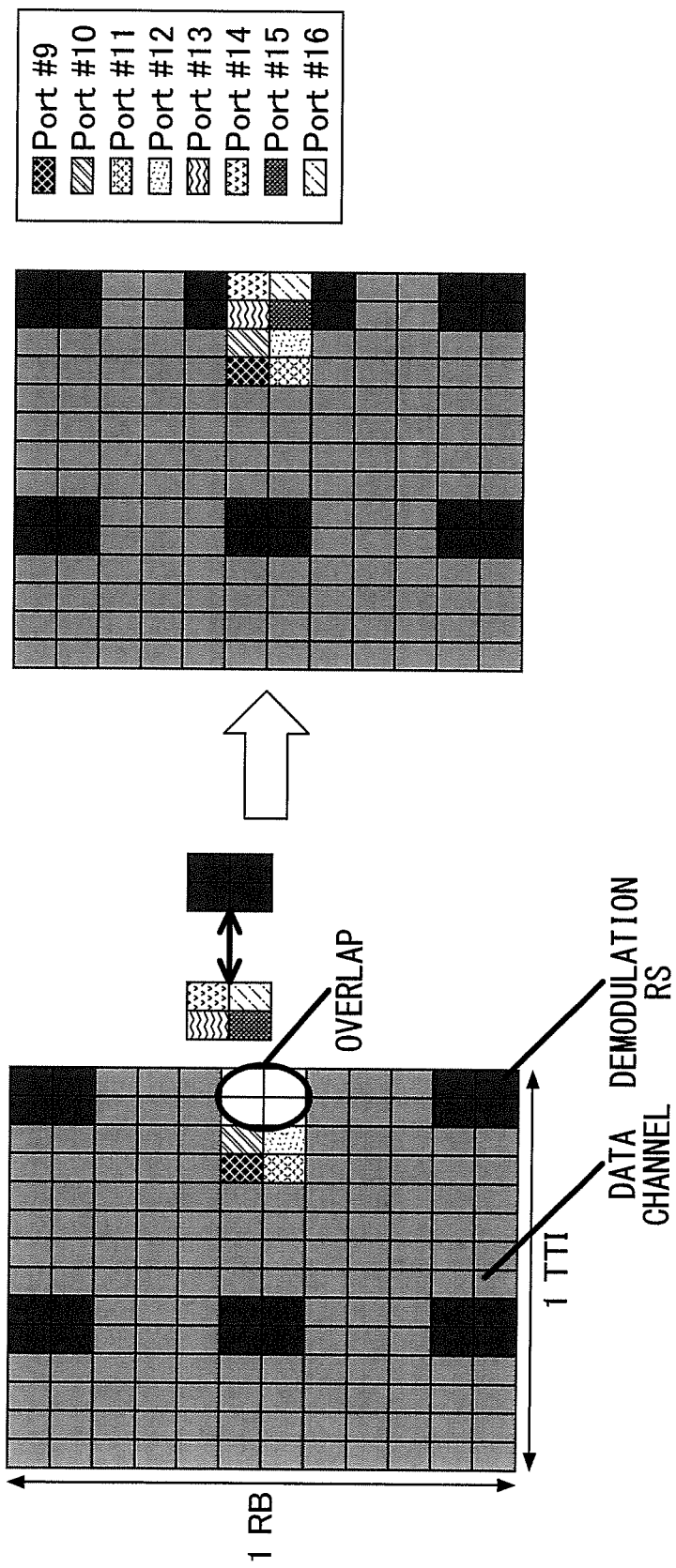
FIG. 18 is a diagram illustrating a mapping example when the second RS is multiplexed in a time interval including a data channel.
Figure 19:
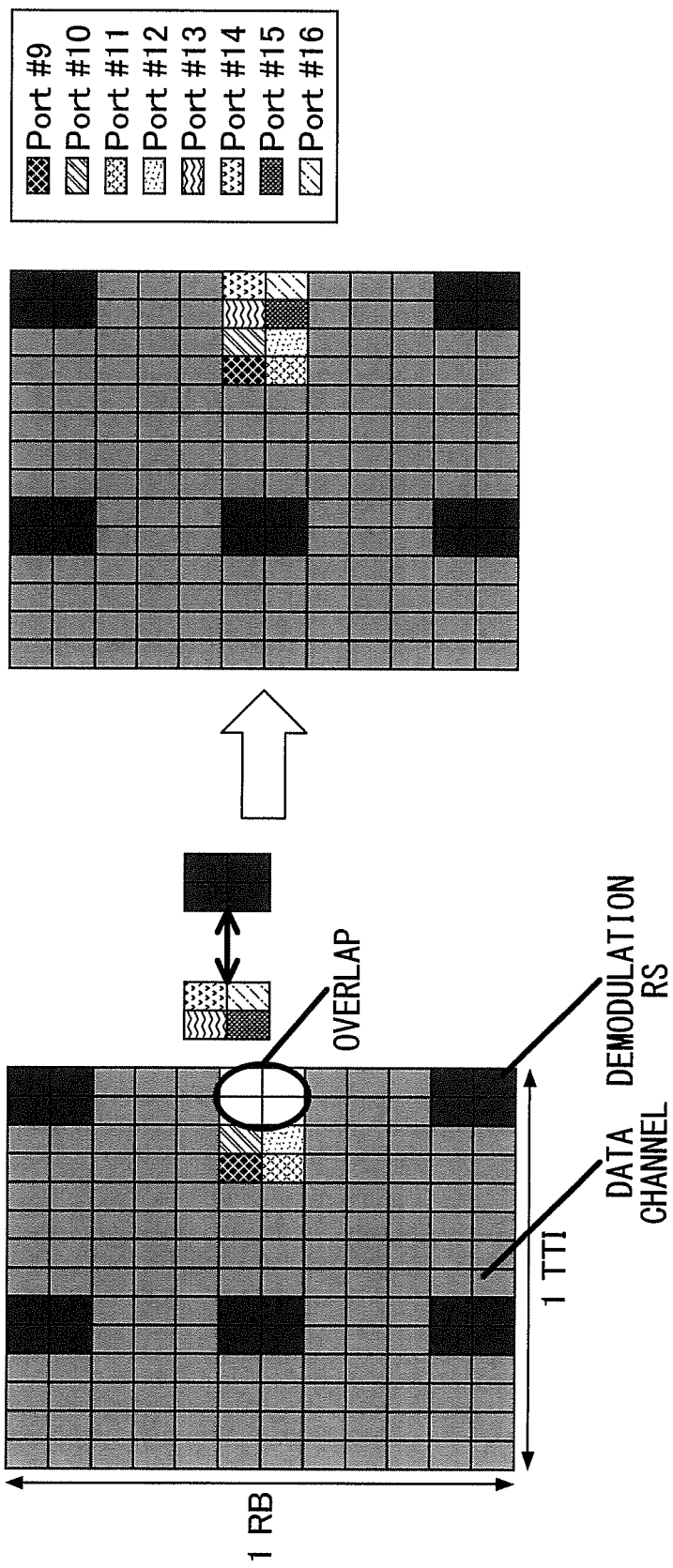
FIG. 19 is a diagram illustrating a mapping example when the second RS is multiplexed in a time interval including a data channel.

FIG. 17 illustrates an example in which the position of the second RS is shifted when the resource position of the demodulation RS and the resource position of the first RS overlap. FIG. 18 illustrates an example in which the position of the demodulation RS is shifted when the resource position of the demodulation RS and the resource position of the second RS overlap. FIG. 19 illustrates an example in which a priority is given to transmission of the second RS, and the demodulation RS is not transmitted (dropped) when the resource position of the demodulation RS and the resource position of the second RS overlap. Further, when the resource position of the demodulation RS and the resource position of the second RS overlap, a priority may be given to the transmission of the demodulation RS, and the second RS may not be transmitted (dropped). Further, when a process of dropping the demodulation RS or the second RS is performed, the base station 1 may perform the process through puncturing.

Figure 20:
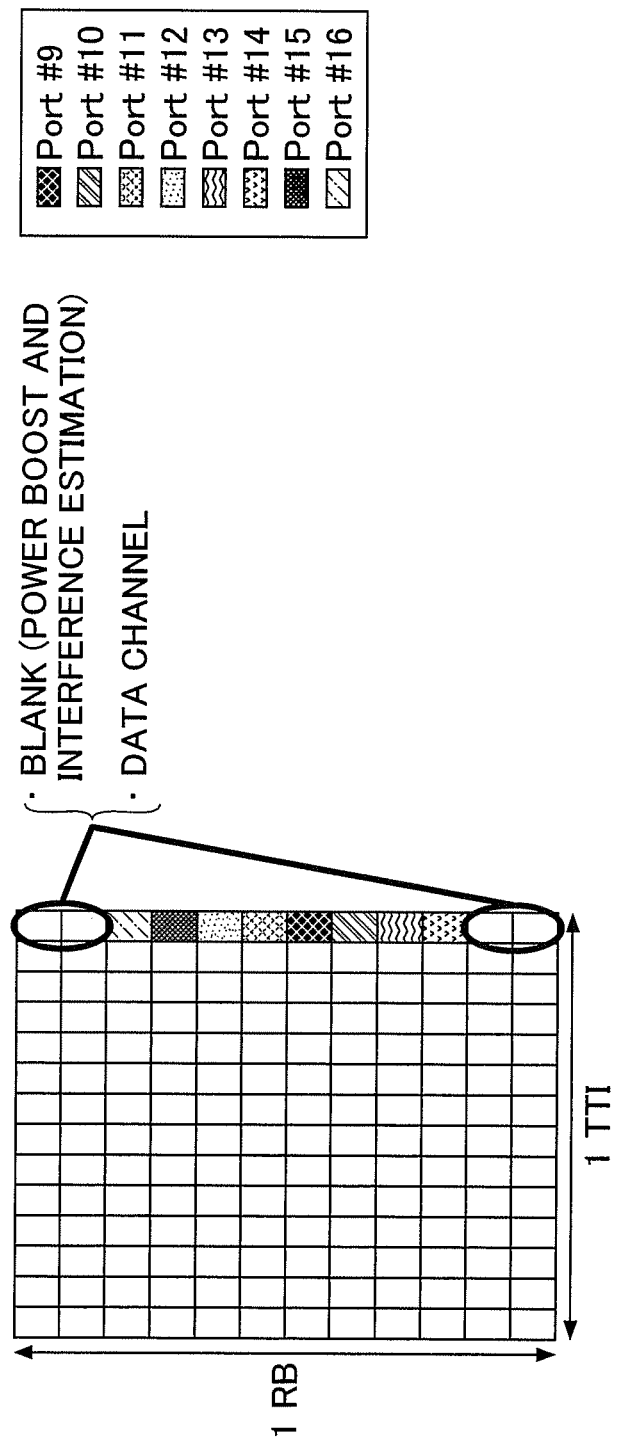
FIG. 20 is a diagram for describing the use of resources to which the second RS is not mapped.

Further, as illustrated in FIG. 20, resources to which the second RS is not mapped (that is, resources in which a radio signal is not transmitted) in a predetermined symbol of the unit area to which the second RS is mapped may be blank. In this case, the base station 1 may boost the transmission power of the second RS using surplus transmission power obtained by setting blank resources for transmission of the second RS or may allocate the data channel. Further, the user equipment UE may estimate an interference wave in blank resources. When the blank resources are set at different positions between cells, the user equipment UE can measure the interference waves from other cells in a blank cell.

(Transmission Cycle of Second RS)

Figure 21:
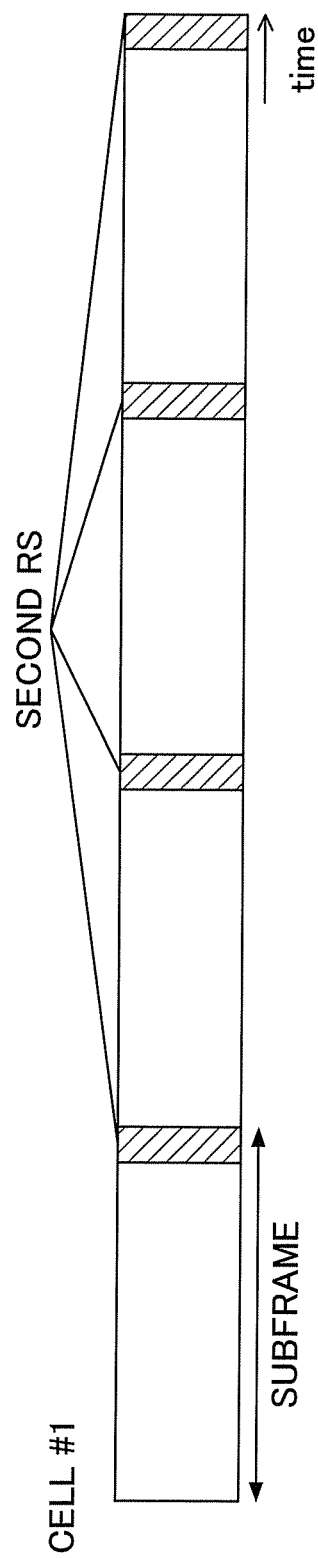
FIG. 21 is a diagram illustrating an example of a transmission cycle of the second RS.
Figure 22:
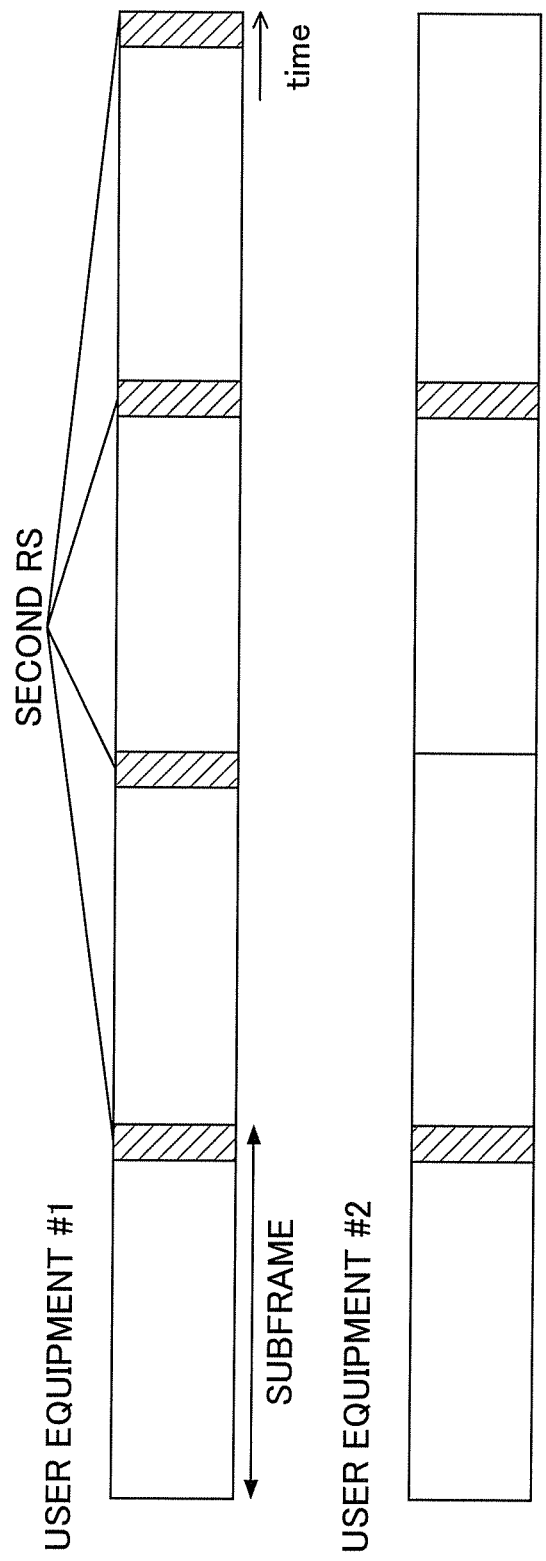
FIG. 22 is a diagram illustrating an example of the transmission cycle of the second RS.

The transmission cycle of the second RS may be common within the cell (broadcast transmission) as illustrated in FIG. 21 or may be different in accordance with each user equipment UE (unicast transmission) as illustrated in FIG. 22.

The transmission cycle of the second RS may be specified in a standard specification or may be reported (set) from the base station 1 to the user equipment UE using broadcast information or a signaling message specific to the user equipment UE (for example, an RRC message). Further, the transmission cycle of the first RS may be reported (set) from the base station 1 to the user equipment UE using the MAC signaling or the PHY signaling.

Figure 23:
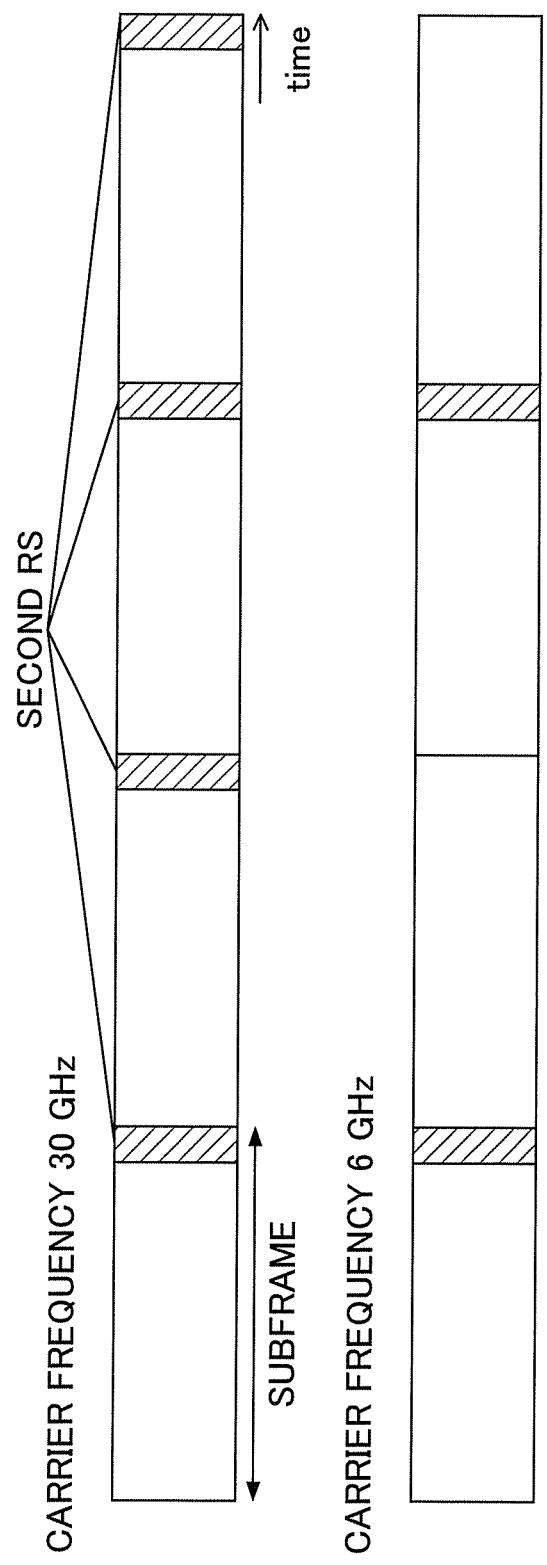
FIG. 23 is a diagram illustrating an example of the transmission cycle of second RS.

The transmission cycle of the second RS may be set in accordance with a carrier frequency, a subcarrier spacing, an average moving speed of the user equipment UE assumed in a carrier, or the like. FIG. 23 illustrates an example in which different transmission cycles are set in a carrier with a carrier frequency of 30 GHz and a carrier with a carrier frequency of 6 GHz. In this case, the user equipment UE may recognize the transmission cycle of the second RS by a notification (setting) from the base station 1 or implicitly recognize on the basis of a system bandwidth, a carrier frequency, or the like. In case of the implicit recognition, since signaling is reduced, the frequency use efficiency can be improved.

Further, the base station 1 may dynamically change the transmission cycle of the second RS, for example, such that the transmission cycle of the second RS is set to 10 ms in a certain period and set to 5 ms in the next period or may semi-statically change the transmission cycle on the basis of a predetermined trigger. In this case, the base station 1 may notify the user equipment UE the transmission cycle and the period to which the transmission cycle in advance or may set the changed transmission cycle in the user equipment UE using the broadcast information or the signaling message specific to the user equipment UE (for example, the RRC message).

Figure 24:
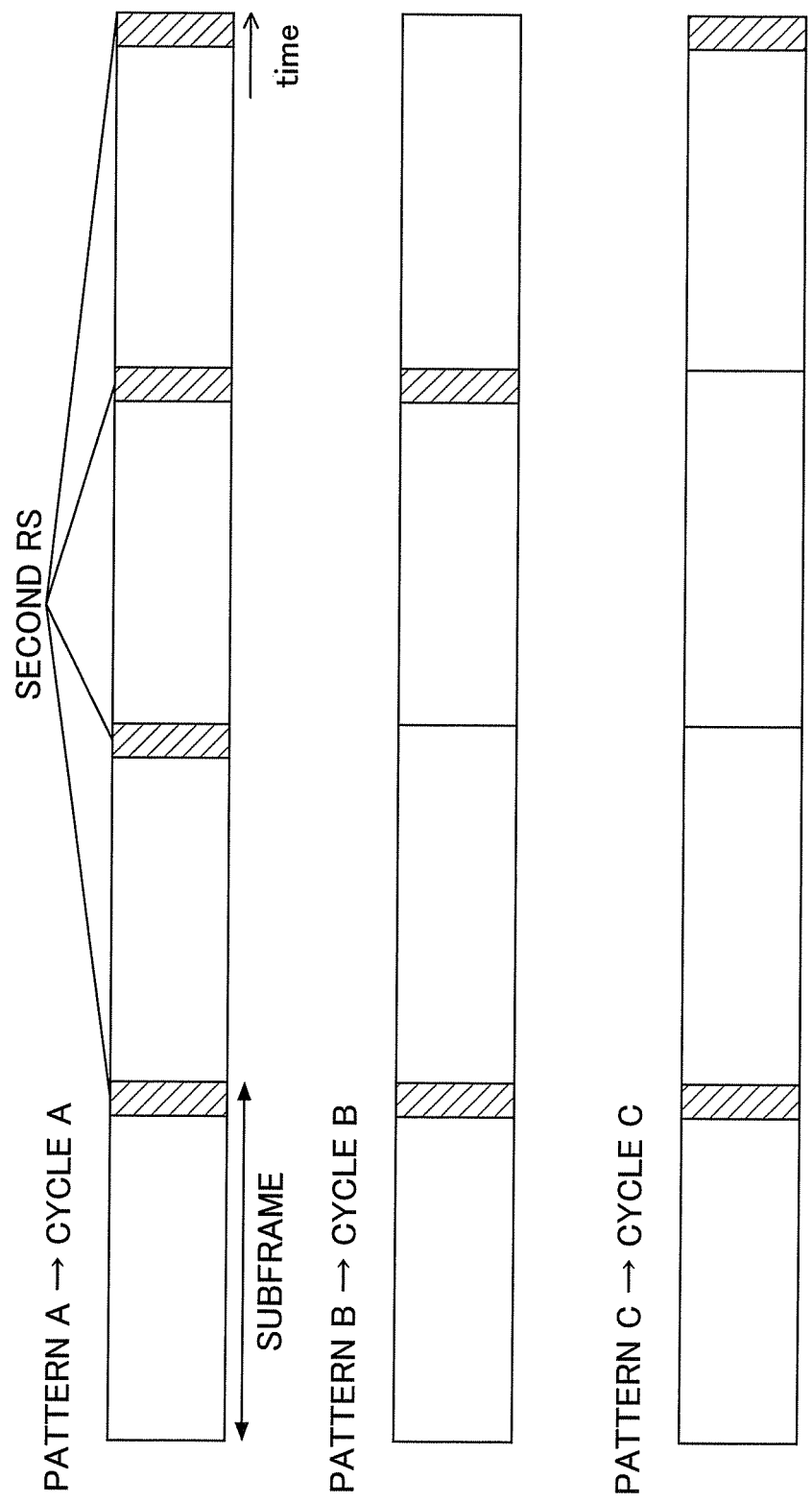
FIG. 24 is a diagram illustrating an example of the transmission cycle of the second RS.

As illustrated in FIG. 24, a plurality of cycle patterns may be specified in advance as the transmission cycle of the second RS, and the base station 1 may transmit the second RS in any one cycle pattern. In this case, in order to enable the user equipment UE to blind detect the cycle pattern in which the second RS is transmitted, for example, the second RSs may be transmitted using a different sequence in each of a plurality of cycle patterns. As a result, the user equipment UE can blind detect the cycle pattern in which the second RS is transmitted by specifying the sequence of first RSs.

Further, the base station 1 may transmit the second RS in order to cause the user equipment UE to measure the second RS. In this case, an instruction to measure the second RS may be given to the user equipment UE using the PHY signaling transmitted in the flexible subframe. In other words, the user equipment UE may perform the processing procedure of step S14 of FIG. 5 upon receiving the instruction through the PHY signaling. More specifically, the base station 1 may set information specifying the mapping pattern of the second RSs corresponding to each antenna port in a predetermined bit of the downlink control information (DL control information) transmitted in the flexible subframe and give a notification indicating the mapping pattern to the user equipment UE. Further, the user equipment UE may report the measurement result to the base station 1 at a predetermined timing or may transmit the measurement result when the uplink data channel is scheduled through the UL grant.

(Setting of mapping pattern of second RSs) The mapping pattern of the second RSs may be specified in a standard specification or may be reported (set) from the base station 1 to the user equipment UE using the broadcast information or the signaling message specific to the user equipment UE (for example, the RRC message). Further, the mapping pattern of the second RSs may be reported (set) from the base station 1 to the user equipment UE through the MAC signaling or the PHY signaling. The sequence of second RSs may also be specified in a standard specification or may be notified (set) from the base station 1 to the user equipment UE using the broadcast information or the signaling message specific to the user equipment UE (for example, the RRC message). Further, the sequence of second RSs may be reported (set) from the base station 1 to the user equipment UE using the MAC signaling or the PHY signaling.

The mapping pattern may be set to differ in accordance with the carrier frequency, the subcarrier spacing, the average moving speed of the user equipment UE assumed in the carrier, and/or the like. Thus, it is possible to perform desired measurement while suppressing degradation in the frequency use efficiency even under various conditions.

Further, the base station 1 may dynamically change the mapping pattern, for example, such that a mapping pattern A is set in a certain period, and a mapping pattern B is set in a next period or may semi-statically change the mapping pattern on the basis of a predetermined trigger. In this case, the base station 1 may notify the user equipment UE of the mapping pattern and the period to which the mapping pattern is applied in advance or may set the changed mapping pattern in the user equipment UE using the broadcast information or the signaling message specific to the user equipment UE (for example, the RRC message).

Further, a plurality of mapping patterns may be specified in advance as the mapping pattern of the second RSs, and the base station 1 may transmit the second RS in any one mapping pattern. In this case, for example, the first RSs are transmitted using a different sequence in each of a plurality of mapping patterns so that the user equipment UE can blind detect the mapping pattern in which the second RS is transmitted. As a result, the user equipment UE can blind detect the mapping pattern in which the second RS is transmitted by specifying the sequence of second RSs.

(Report of Measurement Result)

In the processing procedure of step S14 in FIG. 5, the user equipment UE measures the DL reception quality and/or the channel state for each second RS associated with each antenna port and reports the measurement result to the base station 1 using an uplink control channel (uplink control information). The user equipment UE may collectively report the measurement results for all the antenna ports to the base station 1 or may appropriately report the measurement result for each antenna port for which the measurement has been completed. The reception quality may be an RSRQ, an RSRP, an RSSI, or an SINR or some or all thereof.

Further, the user equipment UE may report only the measurement results corresponding to some antenna ports to the base station 1 without reporting all the measurement results corresponding to all the antenna ports to the base station 1. In this case, an instruction indicating an antenna port of a report target may be explicitly given from the base station 1 to the user equipment UE, or the user equipment UE may select the antenna port of the report target. In the latter case, the user equipment UE may report the reception quality for only the antenna ports whose reception quality is a predetermined threshold value or more.

Further, the user equipment UE may report an average value of the measurement results in a predetermined time interval to the base station 1. For example, in the case in which the second RS is transmitted with a cycle of 10 ms, when a predetermined time interval is 30 ms, the user equipment UE measures the DL reception quality and/or the channel state of each second RS associated with each antenna port over 3 cycles and report the average value of measured reception quality and/or the channel state of each antenna port to the base station 1 for each antenna port.

The length of the predetermined time interval may be specified in a standard specification or may be set (reported) from the base station 1 to the user equipment UE using the broadcast information or the signaling message specific to the user equipment UE (for example, the RRC message). Further, the length of the predetermined time interval may be reported (set) from the base station 1 to the user equipment UE using the MAC signaling or the PHY signaling.

Further, the length of the predetermined time interval may be set to differ in accordance with the carrier frequency, the subcarrier spacing, the average moving speed of the user equipment UE assumed in the carrier, or the like.

Further, the length of the predetermined time interval may be dynamically changed, for example, such that the length of the predetermined time interval is set to "30 ms" in a certain period and "50 ms" in the next period or may be semi-statically changed based on a predetermined trigger.

A plurality of patterns may be specified in advance as a length of a predetermined time interval so that the user equipment UE side may blind detect the pattern in which the measurement results are averaged and reported. For example, the second RSs may be transmitted using a different sequence in each of a plurality of patterns. Thus, the user equipment UE can specify the sequence of second RSs and blind detect the pattern in which the measurement results are average and reported.

Further, the user equipment UE may select the length of the predetermined time interval. Further, when the user equipment UE selects the antenna port of the report target and the predetermined time interval, the user equipment UE may narrow down the antenna ports in which the first RS is measured in advance by measuring the reception quality using the synchronization signal transmitted in the fixed subframe or using the measurement of the reception quality of the first RS.

<Supplemental Matter>

In the above description, when the "mapping pattern of the first RSs," the "transmission cycle of the first RS," the "sequence of first RSs," the "length of the predetermined time interval in which the measurement results of the first RS are averaged," the "mapping pattern of the second RSs," the "transmission cycle of the second RS," the "sequence of second RSs," or the "length of the predetermined time interval in which the measurement results of second RS are averaged" is reported (set) from the base station 1 to the user equipment UE using the broadcast information, the RRC signaling, the MAC signaling, or the PHY signaling, a set value thereof may be reported (set) from the base station 1 to the user equipment UE, or an index value associated with each pattern of a set value may be reported (set) from the base station 1 to the user equipment UE. Thus, it is possible to reduce the signaling amount.

The base station 1 may use the mapping pattern of the first RSs described with reference to FIGS. 6 to 8 (that is, the pattern in which the synchronization signal and the first RS are transmitted in the fixed subframe) and the mapping pattern of the first RSs described with reference to FIG. 9 (the pattern in which the first RS doubles as the synchronization signal) in combination. For example, the base station 1 may apply the mapping pattern of the first RSs described with reference to FIGS. 6 to 8 in a certain time zone and apply the mapping pattern of the first RSs described with reference to FIG. 9 another time zone. In this case, the base station 1 may set the mapping pattern of the first RSs to be applied for each time zone in the user equipment UE.

The user equipment UE may use the first RS or second RS when performing a synchronization process (time synchronization and frequency synchronization).

<Exemplary Operation>

Next, an exemplary operation of the radio communication system according to the present embodiment will be described with reference to FIG. 25. In the present exemplary operation, the base station 1 is assumed to be the hybrid massive MIMO base station.

First, as illustrated in FIG. 25(a), the base station 1 transmits the first RSs associated with five beams (for example, the antenna ports #1 to 5) in the fixed subframe using the analog beam forming. The base station 1 does not transmit the five beams at the same time but transmits the beams while sequentially switching the beams over time.

Then, the user equipment UE reports the measurement results to the base station 1 for the first RSs associated with the antenna ports #1 to #5. Then, the base station 1 roughly decides a beam direction on the basis of the measurement results (for example, reception power) of the first RSs reported from the user equipment UE. Here, the beams are assumed to be narrowed down to two beams illustrated in FIG. 25(a). Then, the base station 1 transmits the second RSs associated with a plurality of beams having finer granularity (for example, the antenna ports #11 to 15) in the flexible subframe by performing the analog beam forming and the digital beam forming together around the decided rough beam direction in order to decide a more detailed beam direction. The base station 1 notifies the user equipment UE of the flexible subframe in which the second RS is transmitted in advance by using the RRC signaling or the like.

Then, the user equipment UE reports the measurement result to the base station 1 for each of the second RSs associated with the antenna ports #10 to #15. Then, the base station 1 decides a final beam direction on the basis of the measurement results (for example, receiving power) for the second RSs reported from the user equipment UE. The base station 1 may instruct the user equipment UE to report the measurement results for the first RS and the second RS periodically. Accordingly, even when the user equipment UE moves, it is possible to follow the beam direction.

<Functional Configuration>

(Base Station)

Figure 26:
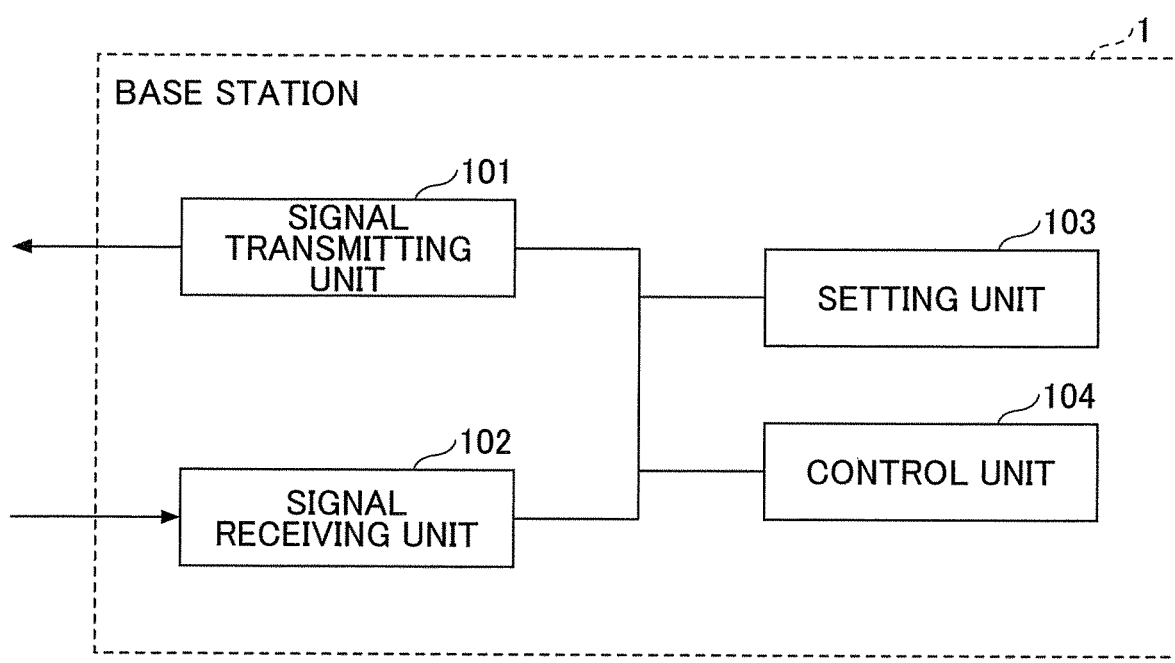
FIG. 26 is a diagram illustrating an example of a functional configuration of a base station according to an embodiment.

FIG. 26 is a diagram illustrating an example of a functional configuration of the base station according to the embodiment. As illustrated in FIG. 26, the base station 1 includes a signal transmitting unit 101, a signal receiving unit 102, a setting unit 103, and a control unit 104. FIG. 26 illustrates only functional units of the base station 1 particularly related to the embodiment of the present invention, and functions (not illustrated) of performing operations conforming to at least 5G (including LTE) are also provided. Further, the functional configuration illustrated in FIG. 26 is merely an example. Any classification or any name may be used as a function classification or a name of a functional unit as long as the operation according to the preset embodiment can be performed.

The signal transmitting unit 101 has a function of generating various kinds of signals of the physical layer from signals of a higher layer to be transmitted from the base station 1 and wirelessly transmitting the signals. The signal transmitting unit 101 further has a function of transmitting the first RS and the second RS. The signal receiving unit 102 has a function of receiving various kinds of signals from the user equipment UE and acquiring a signal of the higher layer from the received signal of the physical layer.

The setting unit 103 has a function of setting various kinds of information used for the user equipment UE to perform the operation according to the present embodiment in the user equipment UE by using the broadcast information or the RRC signaling. Examples of various kinds of information include the "mapping pattern of the first RSs," the "transmission cycle of the first RS," the "sequence of first RSs," the "length of the predetermined time interval in which the measurement results of the first RS are averaged," the "mapping pattern of the second RSs," the "transmission cycle of the second RS," the "sequence of second RSs," and the "length of the predetermined time interval in which the measurement results of second RS are averaged."

The control unit 104 has a function of controlling the direction of the beam on the basis of the measurement result reported from the user equipment UE. The control unit 104 further has a function of deciding and changing the cycles in which the first RS and the second RS are transmitted and the mapping patterns of the first RSs and the second RSs.

(User Equipment)

Figure 27:
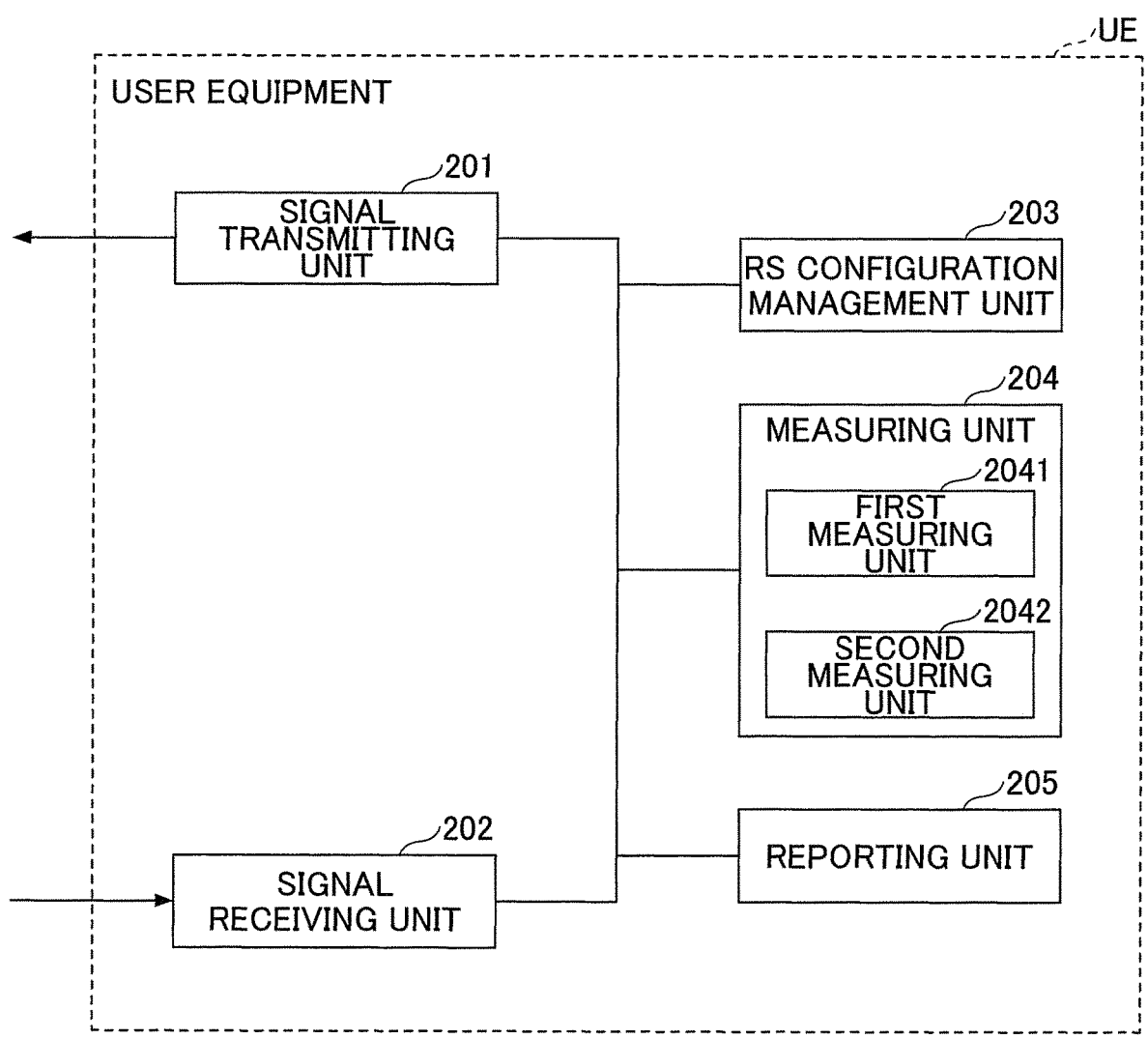
FIG. 27 is a diagram illustrating an example of a functional configuration of a user equipment according to the embodiment.

FIG. 27 is a diagram illustrating an example of a functional configuration of the user equipment according to the embodiment. As illustrated in FIG. 27, the user equipment UE includes a signal transmitting unit 201, a signal receiving unit 202, an RS configuration management unit 203, a measuring unit 204, and a reporting unit 205. FIG. 27 illustrates only functional units of the user equipment UE particularly related to the embodiment of the present invention, and functions (not illustrated) of performing operations conforming to at least 5G (including LTE) are also provided. Further, the functional configuration illustrated in FIG. 27 is merely an example. Any classification or any name may be used as a function classification or a name of a functional unit as long as the operation according to the preset embodiment can be performed.

The signal transmitting unit 201 has a function of generating various kinds of signals of the physical layer from signals of a higher layer to be transmitted from the user equipment UE and wirelessly transmitting the signals. The signal receiving unit 202 has a function of wirelessly receiving various kinds of signals from the base station 1 and acquiring a signal of the higher layer from the received signal of the physical layer.

The RS configuration management unit 203 has a function of managing the "mapping pattern of the first RSs," the "transmission cycle of the first RS," the "sequence of first RSs," the "length of the predetermined time interval in which the measurement results of the first RS are averaged," the "mapping pattern of the second RSs," the "transmission cycle of the second RS," the "sequence of second RSs," and the "length of the predetermined time interval in which the measurement results of second RS are averaged" which are specified in a standard specification or set through the broadcast information, the RRC signaling, the MAC signaling, or the PHY signaling.

The measuring unit 204 has a function of recognizing the radio resources in which the first RS is transmitted and the radio resources in which the second RS is transmitted on the basis of the "mapping pattern of the first RSs," the "transmission cycle of the first RS," the "sequence of first RSs," the "mapping pattern of the second RSs," the "transmission cycle of the second RS," and the "sequence of second RSs" and measuring the reception quality and/or the channel state. The measuring unit 204 includes a first measuring unit 2041 and a second measuring unit 2042.

The first measuring unit 2041 measures the reception quality or the channel information using the first RSs which are transmitted in a time interval (fixed subframe) which is periodically set in a radio frame divided into predetermined time intervals.

The second measuring unit 2042 measures the reception quality or the channel information using the second RSs which are transmitted in a flexibly-selected time interval (flexible subframe) other than a time interval (fixed subframe) which is periodically set in a radio frame divided into predetermined time intervals.

The reporting unit 205 has a function of reporting the reception quality or the channel information measured using the first RS and the reception quality or the channel information measured using the second RS to the base station 1.

<Hardware Configuration>

In the block diagrams (FIGS. 26 and 27) used in the description of the above embodiment, the blocks of the functional units are illustrated. The functional blocks (configuring units) are implemented by a flexibly-selected combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 28:
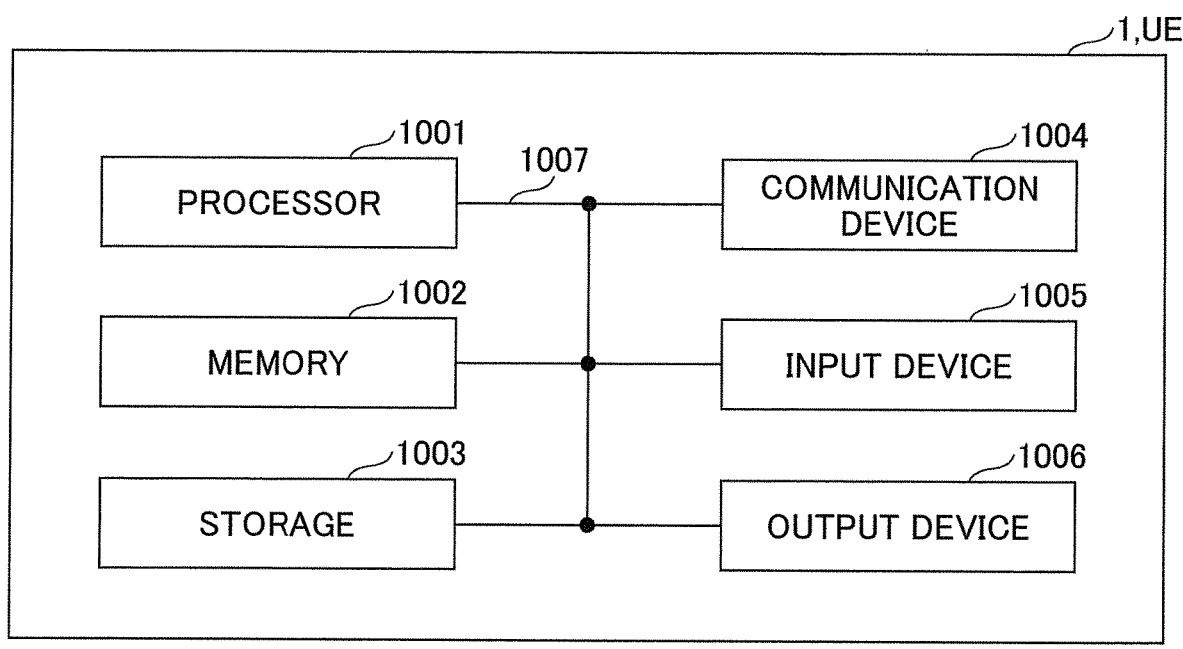
FIG. 28 is a diagram illustrating an example of hardware configurations of a base station and a user equipment according to an embodiment.

For example, the base station 1 and the user equipment UE in one embodiment of the present invention may function as a computer that performs the process of the radio communication method of the present invention. FIG. 28 is a diagram illustrating an example of the hardware configurations of the base station 1 and the user equipment UE according to the embodiment. Each of the base station 1 and user equipment UE may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of the base station 1 and the user equipment UE may be configured to include one or more devices illustrated in the drawing or may be configured without including some devices.

Each function in each of the base station 1 and the user equipment UE is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, the signal transmitting unit 101, the signal receiving unit 102, the setting unit 103, and the control unit 104 of the base station 1 and the signal transmitting unit 201, the signal receiving unit 202, the RS configuration management unit 203, the measuring unit 204, and the reporting unit 205 of the user equipment UE may be implemented by the processor 1001.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the signal transmitting unit 101, the signal receiving unit 102, the setting unit 103, and the control unit 104 of the base station 1 and the signal transmitting unit 201, the signal receiving unit 202, the RS configuration management unit 203, the measuring unit 204, and the reporting unit 205 of the user equipment UE may be implemented by a control program which is stored in the memory 1002 and operates on the processor 1001, or the other functional blocks may be similarly implemented. Various kinds of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transceiving device) for performing communication between computers via a wired and/or wireless network and is also referred to as a "network device," a "network controller," a "network card," a "communication module," or the like. For example, the signal transmitting unit 101 and the signal receiving unit 102 of the base station 1 and the signal transmitting unit 201 and the signal receiving unit 202 of the user equipment UE may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the memory 1002 are connected via the bus 1007 to communicate information with each other. The bus 1007 may be configured with a single bus or may be configured with different buses between the devices.

Further, the base station 1 and the user equipment UE may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

<Conclusion>

According to an embodiment, provided is a user equipment in a radio communication system including a base station and the user equipment, including a first measuring unit that measures a reception quality or channel information using a first reference signal transmitted in a time interval which is set periodically in a radio frame divided into predetermined time intervals, a second measuring unit that measures the reception quality or the channel information using a second reference signal transmitted in a flexibly-selected time interval other than the time interval which is set periodically in the radio frame divided into the predetermined time intervals, and a reporting unit that reports the reception quality or the channel information measured using the first reference signal and the reception quality or the channel information measured using the second reference signal to the base station. According to the user equipment UE, a technique capable of enabling the user equipment to measure the reference signal and feed a measurement result back to the base station is provided.

As the first reference signal, reference signals associated with different antenna ports may be time-division-multiplexed and transmitted. Thus, the base station 1 can transmit the first RS while sequentially switching the beams over time.

The first reference signal may be transmitted in any one of a plurality of cycle patterns and transmitted using a different sequence in each of the plurality of cycle patterns. Thus, the user equipment UE can blind detect the cycle in which the first RS is transmitted.

As the second reference signal, reference signals associated with different antenna ports may be frequency-division-multiplexed, code-division-multiplexed, or time-division-multiplexed and transmitted, and an antenna port associated with the second reference signal may be different from an antenna port associated with the first reference signal. Thus, the base station 1 can transmit the second RS through various multiplexing methods.

An indication (notification) of radio resources in which the second reference signal is transmitted in the flexibly-selected time interval may be given through downlink control information transmitted from the base station in the flexibly-selected time interval. Thus, the base station 1 can dynamically notify the user equipment UE of the mapping pattern of the second RSs in units of subframes.

According to an embodiment, provided is a measurement method performed by a user equipment in a radio communication system including a base station and the user equipment, including: a step of measuring a reception quality or channel information using a first reference signal transmitted in a time interval which is set periodically in a radio frame divided into predetermined time intervals; a step of measuring the reception quality or the channel information using a second reference signal transmitted in a flexibly-selected time interval other than the time interval which is set periodically in the radio frame divided into the predetermined time intervals; and a step of reporting the reception quality or the channel information measured using the first reference signal and the reception quality or the channel information measured using the second reference signal to the base station. According to the measurement method, a technique capable of enabling the user equipment to measure the reference signal and feed a measurement result back to the base station is provided.

Supplement of Embodiment

The present embodiment has been described under the assumption that one RB in the frequency direction includes 12 subcarriers, and one TTI includes 14 symbols, but the present invention is not limited thereto. One RB in the frequency direction may include a different number of subcarriers than 12 subcarriers as a unit thereof, and one TTI may have a different number of symbols than 14 symbols as a unit thereof.

The present embodiment has been described under the assumption that the number of antenna ports of the first RSs and the number of antenna ports of the second RSs are 8, respectively, but the present invention is not limited thereto. The number of antenna ports of the first RSs and the number of antenna ports of the second RSs may be a value more than 8 such as 16 or a value less than 8 such as 4.

The subframe may be referred to as a "time interval." The fixed subframe may be referred to as a "subframe" or a "time interval" to which either or both of the synchronization signal and the broadcast information are mapped. The flexible subframe may be referred to as a "subframe" or a "time interval" to which the data signal is mapped. The beam may be referred to as an "antenna port."

A digital beam may be a generic name of one antenna port or a combination of a plurality of antenna ports. RSs associated with the analog beam may be used as the first RSs (a first RS group), and RSs associated with the digital beam may be used as second RSs (a second RS group).

The PDSCH may be referred to as a "downlink link shared channel" or a "downlink link data channel." The DMRS may be referred to as a "data demodulation reference signal." The cell ID may be referred to as a "cell-specific index." The RB may be referred to as a "resource unit," a "subband," a "scheduling unit," or a "frequency unit." The TTI may be referred to as a "time unit" or a "subframe."

The PSS/SSS may be referred to as a "first/second synchronization signal" or may be referred to as a "synchronization signal" without distinguishing them. The uplink control information (UCI) may be referred to as "uplink control information." The PUSCH may be referred to as a "physical uplink shared channel" or an "uplink data channel." The PUCCH may be referred to as a "physical uplink control channel" or an "uplink control channel."

The present embodiment has been described under the assumption that one RB is configured with 12 subcarriers in accordance with LTE, but the present invention is not limited thereto, and an RB configured with a predetermined number of subcarriers specified in NewRAT of 5G is included. Further, the above description has been made under the assumption that one TTI is configured with 14 symbols in accordance with LTE, but the present invention is not limited thereto, and an TTI length configured with a predetermined number of symbols specified in NewRAT of 5G is included.

An indication (notification) of information is not limited to the aspect or embodiment described in this specification and may be given by any other method. For example, the notification of information may be given by physical layer signaling (for example, the DCI or the UCI), higher layer signaling (for example, the RRC signaling, the MAC signaling, the broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment of the present invention may be applied to LTE, LTE-A, SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended on the basis of these standards.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

In this specification, a specific action that is supposed to be performed by the base station may be performed by an upper node in some cases. In the network configured with one or more network nodes including the base station, various actions performed for communication with the terminal can be obviously performed by the base station and/or any network node (for example, an MME, an S-GW, or the like is considered, but it is not limited thereto) other than the base station. The example in which the number of network nodes excluding the base station is one has been described above, but a combination of a plurality of other network nodes (for example, an MME and an S-GW) may be provided.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The reference signal may be referred to as a pilot in accordance with standards to be applied.

A phrase "on the basis of" used in this specification is not limited to "on the basis of only" unless otherwise stated. In other words, a phrase "on the basis of" means both "on the basis of only" and "on the basis of at least."

Any reference to an element using a designation such as "first," "second," or the like used in this specification does not generally restrict quantities or an order of those elements. Such designations can be used in this specification as a convenient method of distinguishing between two or more elements. Thus, reference to the first and second elements does not mean that only two elements can be adopted there, or first element must precede the second element in a certain form.

"Including," "comprising," and variations thereof are intended to be comprehensive, similarly to a term "equipped with" as long as the terms are used in this specification or claims set forth below. Furthermore, the term "or" used in this specification or claims set forth below is intended not to be an exclusive disjunction.

A radio frame may be configured with one or more frames in the time domain. Each of one or more frames in the time domain is also referred to as a subframe. Further, the subframe may be configured with one or more slots in the time domain. Further, the slot may be configured with one or more symbols (OFDM symbols, SC-FDMA symbols, or the like) in the time domain.

Each of the radio frame, the subframe, the slot, and the symbol indicate a time unit when signals are transmitted. The radio frame, the subframe, the slot, and the symbol may have different corresponding names. For example, in an LTE system, the base station performs scheduling to allocate radio resources (a frequency bandwidth, transmission power or the like usable in each mobile station) to each mobile station.

A minimum time unit of scheduling may be referred to as a TTI. For example, one subframe may be referred to as a TTI, a plurality of consecutive subframes may be referred to as a TTI, or one slot may be referred to as a TTI.

The resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be configured with one or more resource blocks. The structure of the radio frame described above is merely an example, and the number of subframes included in the radio frame, the number of slots included in the subframe, the number of symbols and resource blocks included in the slot, and the number of subcarriers included in the resource block can be changed variously.

Although the present invention has been described above in detail, it is obvious to those having skill in the art that the present invention is not limited to the embodiments described in this specification. The present invention can be carried out as revisions and modifications without departing from the gist and scope of the present invention decided in claims set forth below. Therefore, the description of this specification is intended to be exemplary and does not have any restrictive meaning to the present invention.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

Transmission of predetermined information (e.g., transmission of "it is X") is not limited to explicitly-performed transmission. The transmission of predetermined information may be performed implicitly (e.g., explicit transmission of predetermined information is not performed).

The present application is based on and claims priority to Japanese patent application No. 2016-096571 filed on May 12, 2016, the entire contents of which are hereby incorporated by reference.

EXPLANATIONS OF LETTERS OR NUMERALS 1 base station
UE user equipment
101 signal transmitting unit
102 signal receiving unit
103 setting unit
104 control unit
201 signal transmitting unit
202 signal receiving unit
203 RS configuration management unit
204 measuring unit
2041 first measuring unit
2042 second measuring unit
205 reporting unit
1001 processor
1002 memory
1003 storage
1004 communication device
1005 input device
1006 output device

The invention claimed is:

1. A terminal comprising:
a reception unit configured to receive a first reference signal that is specific to a cell and periodically transmitted from a base station and a second reference signal that is specific to the terminal and periodically or non-periodically transmitted from the base station; and
a transmission unit configured to transmit a report to the base station based on a measurement result based on the first reference signal and a measurement result based on the second reference signal,
wherein the first reference signal is broadcast by the base station,
wherein the first reference signal is used for synchronization,
wherein the first reference signal is transmitted using one of a plurality of different sequences, using one of a plurality of cycle patterns, and using one of a plurality of subcarrier spacings, and
wherein a measurement period using the first reference signal is determined based on the subcarrier spacing.

2. The terminal according to claim 1, wherein an antenna port corresponding to the first reference signal is different from an antenna port corresponding to the second reference signal.

3. The terminal according to claim 1, wherein a radio resource in which the second reference signal is transmitted is indicated by uplink layer signaling transmitted from the base station.

4. A method comprising:
receiving a first reference signal that is specific to a cell and periodically transmitted from a base station and a second reference signal that is specific to a terminal and periodically or non-periodically transmitted from the base station; and
transmitting a report to the base station based on a measurement result based on the first reference signal and a measurement result based on the second reference signal,
wherein the first reference signal is broadcast by the base station,
wherein the first reference signal is used for synchronization,
wherein the first reference signal is transmitted using one of a plurality of different sequences, using one of a plurality of cycle patterns, and using one of a plurality of subcarrier spacings, and
wherein a measurement period using the first reference signal is determined based on the subcarrier spacing.

* * * * *